US012790049B2

(12) United States Patent
Parrinello et al.

(10) Patent No.: US 12,790,049 B2
(45) Date of Patent: Nov. 10, 2026

(54) METHOD FOR THE PRODUCTION AND FILLING OF CONTAINERS DESIGNED TO CONTAIN FOOD

(71) Applicant: SACMI IMOLA S.C., Imola (IT)

(72) Inventors: Fiorenzo Parrinello, Medicina (IT); Gianni Minganti, Imola (IT); Fabrizio Pucci, Castel Guelfo di Bologna (IT); Alberto Di Giacomo, Imola (IT); Eleonora Balducci, Mondolfo (IT); Valentina Fiumi, Imola (IT)

(73) Assignee: SACMI IMOLA S.C., Imola (IT)

( * ) Notice: Subject to any disclaimer, the term of this patent is extended or adjusted under 35 U.S.C. 154(b) by 69 days.

(21) Appl. No.: 17/792,229

(22) PCT Filed: Jan. 12, 2021

(86) PCT No.: PCT/EP2021/050480
§ 371 (c)(1),
(2) Date: Jul. 12, 2022

(87) PCT Pub. No.: WO2021/144263
PCT Pub. Date: Jul. 22, 2021

(65) Prior Publication Data
US 2023/0068772 A1 Mar. 2, 2023

(30) Foreign Application Priority Data
Jan. 17, 2020 (IT) ........................ 102020000000787

(51) Int. Cl.
*B65B 9/04* (2006.01)
*B29D 22/00* (2006.01)
(Continued)

(52) U.S. Cl.
CPC .............. *B65B 9/04* (2013.01); *B29D 22/003* (2013.01); *B65B 25/001* (2013.01); *B65B 47/04* (2013.01);
(Continued)

(58) Field of Classification Search
CPC ......... B65B 9/04; B65B 25/001; B65B 47/04; B65B 61/02; B29D 22/003;
(Continued)

(56) References Cited

U.S. PATENT DOCUMENTS 3,909,582 A * 9/1975 Bowen ............... B23K 26/0846 383/207
4,223,128 A * 9/1980 Halek ........................ B29B 9/16 528/308.2
(Continued)

FOREIGN PATENT DOCUMENTS

CN 1242749 A 1/2000
CN 104411476 A 3/2015
(Continued)

OTHER PUBLICATIONS

Dr. Angela Hammer "Thermal Analysis of Polymers Part 1: DSC of thermoplastics", Application Handbook, Selected Applications Thermal Analysis, Mettler Toledo UserCom 31, pp. 2-11.
(Continued)

*Primary Examiner* — Veronica Martin
*Assistant Examiner* — Mobeen Ahmed
(74) *Attorney, Agent, or Firm* — CANTOR COLBURN LLP

(57) ABSTRACT

A method for the production and filling of containers designed to contain food, includes the steps of
shaping a sheet made of PET (polyethylene terephthalate) in order to provide accommodation receptacles provided with at least one access inlet;
(Continued)

filling, through the access inlet, the accommodation receptacles with at least one food;
sealing the access inlet using a closure film; and
providing a weakened portion at a connecting edge between at least two adjacent accommodation receptacles.

The final degree of crystallinity at the weakened portion is lower than, equal to, or greater than, at most by a percentage equal to 3%, the degree of crystallinity of portions of the connecting edge not affected by modifications occurring as a consequence of the step of emission of laser radiation and of the sealing step.

12 Claims, 20 Drawing Sheets

(51) Int. Cl.

| | |
|---|---|
| ***B65B 25/00*** | (2006.01) |
| ***B65B 47/04*** | (2006.01) |
| ***B65B 61/02*** | (2006.01) |
| *B29K 67/00* | (2006.01) |
| *B29K 105/00* | (2006.01) |

(52) U.S. Cl.
CPC ........ *B65B 61/02* (2013.01); *B29K 2067/003* (2013.01); *B29K 2105/256* (2013.01); *B29K 2995/0026* (2013.01)

(58) Field of Classification Search
CPC ........ B29K 2067/003; B29K 2105/256; B29K 2995/0026
See application file for complete search history.

(56) References Cited

U.S. PATENT DOCUMENTS

| | | | | | |
|---|---|---|---|---|---|
| 5,820,953 | A * | 10/1998 | Beer | B29C 71/04 | 428/178 |
| 6,187,422 | B1 * | 2/2001 | Murschall | B29C 48/07 | 428/96 |
| 6,427,420 | B1 * | 8/2002 | Olivieri | B23K 26/364 | 493/212 |
| 6,945,017 | B1 * | 9/2005 | Bonney | B29C 65/1654 | 53/DIG. 2 |
| 7,845,147 | B2 * | 12/2010 | Henderson | B65D 1/30 | 53/591 |
| 10,625,034 | B2 * | 4/2020 | Bergey | B65B 9/045 | |
| 2003/0019848 | A1 * | 1/2003 | Nicholas | B23K 26/0342 | 219/121.76 |
| 2003/0051440 | A1 * | 3/2003 | Chow | B29C 59/007 | 493/227 |
| 2007/0084553 | A1 * | 4/2007 | Nakajima | B29C 66/341 | 156/380.9 |
| 2007/0284032 | A1 * | 12/2007 | Stoppelmann | B29C 59/007 | 156/272.8 |
| 2008/0131643 | A1 * | 6/2008 | Schlemmer | B23K 26/389 | 216/94 |
| 2009/0252978 | A1 * | 10/2009 | Katayama | B29C 66/7461 | 156/272.8 |
| 2009/0302579 | A1 * | 12/2009 | Lippert | B23C 3/30 | 280/728.1 |
| 2009/0314664 | A1 * | 12/2009 | Henke | B65D 83/0463 | 206/204 |
| 2010/0003378 | A1 | 1/2010 | Longo et al. | | |
| 2010/0029455 | A1 * | 2/2010 | Skopek | B31B 70/00 | 493/224 |
| 2010/0072104 | A1 * | 3/2010 | Kohl | B65B 61/02 | 53/471 |
| 2011/0051053 | A1 * | 3/2011 | Okamura | G02B 5/3083 | 349/96 |
| 2011/0073576 | A1 * | 3/2011 | Bucklew | B23K 26/0846 | 219/121.72 |
| 2011/0256274 | A1 * | 10/2011 | Longo | B32B 27/32 | 53/471 |
| 2013/0008137 | A1 * | 1/2013 | Py | B65B 55/10 | 53/425 |
| 2013/0008825 | A1 * | 1/2013 | McArthur | B65B 61/18 | 53/462 |
| 2013/0077898 | A1 * | 3/2013 | Doll | B65D 75/58 | 493/212 |
| 2013/0244364 | A1 * | 9/2013 | Gardner | C30B 23/025 | 438/47 |
| 2013/0284711 | A1 * | 10/2013 | Huang | C21D 8/1294 | 219/121.69 |
| 2013/0302894 | A1 * | 11/2013 | Bekele | C12M 23/14 | 428/483 |
| 2015/0266663 | A1 * | 9/2015 | Joseph | A61F 13/5511 | 206/526 |
| 2015/0367566 | A1 * | 12/2015 | Schwab | B29C 66/1142 | 53/167 |
| 2016/0368252 | A1 * | 12/2016 | Sargeant | B32B 27/06 | |
| 2017/0015268 | A1 * | 1/2017 | Dorn | B29C 59/007 | |
| 2018/0305074 | A1 * | 10/2018 | Clarke | B65D 17/404 | |
| 2018/0326535 | A1 * | 11/2018 | Jung | B23K 26/123 | |
| 2019/0106258 | A1 * | 4/2019 | Sanfilippo | B23K 26/0006 | |
| 2021/0245909 | A1 * | 8/2021 | Kawai | B65B 9/045 | |
| 2021/0284409 | A1 * | 9/2021 | Lennartsson | B32B 38/04 | |
| 2022/0004033 | A1 * | 1/2022 | Fishbaine | B23K 26/03 | |
| 2022/0234779 | A1 * | 7/2022 | Spohn | A61M 5/1408 | |
| 2022/0234803 | A1 * | 7/2022 | Chaturvedi | C09J 7/22 | |
| 2022/0403422 | A1 * | 12/2022 | Auclair | C08J 11/105 | |
| 2023/0294860 | A1 * | 9/2023 | Minganti | B29C 51/445 | 53/456 |
| 2026/0091540 | A1 * | 4/2026 | Scheidt | B29C 48/0019 | |

FOREIGN PATENT DOCUMENTS

| | | | |
|---|---|---|---|
| CN | 108495793 | A | 9/2018 |
| CN | 110139746 | A | 8/2019 |
| CN | 110691671 | A | 1/2020 |
| GB | 2543495 | A | 4/2017 |
| JP | 2006151456 | A | 6/2006 |
| JP | 2010137889 | A | 6/2010 |
| JP | 6058194 | B1 | 12/2016 |
| JP | 2018086706 | A | 6/2018 |
| JP | 2018187810 | A | 11/2018 |
| WO | 2009057507 | A1 | 5/2009 |
| WO | 2018065259 | A1 | 4/2018 |

OTHER PUBLICATIONS

G. Ellis et al., "FT Raman study of orientation and crystallization processes in poly(ethylene terephthalate) " Spectrochimica Acta Part A, Elsevier, 1995, vol. 51, pp. 2139-2145.
International Search Report issued Mar. 18, 2021 re: Application No. PCT/EP2021/050480, pp. 1-3, citing: WO 2018/065259 A1 and GB 2 543 495 A.
IT Search Report issued Sep. 10, 2020 re: Application No. 202000000787, pp. 1-8, citing: WO 2018/065259 A1 and GB 2 543 495 A.
J. S. Rossier et al. "Topography, Crystallinity and Wettability of Photoablated PET Surfaces", Langmuir, 1999, 15, pp. 5173-5178.
J. S. Rossier et al., "A Study of Polymer Crystallinity Using the RamanStation 400F", Raman Spectroscopy, PerkinElmer, www.perkinelmer.com; vol. 15, 1999, pp. 1-2.
J.C. Rodriguez-Cabello et al., "Fourier Transform Raman Study of the Conformers in Poly(ethylene terephthalate)" Journal of Raman Spectroscopy, 1994, vol. 25, pp. 335-344.
Mark F. Sonnenschein et al. "Highresolution ablation of amorphous polymers using CO2 laser irradiation" Applied Physics Letters, Jul. 30, 1990, vol. 57, No. 5, pp. 425-427.
R. L. Blaine "Polymer Heats of Fusion", Thermal Applications Note, Spectrochimica Acta Part A, 1995, vol. 51, 1-2.
S. G. Kazarian, et al. "Applications of vibrational spectroscopy to characterize poly(ethylene terephthalate) processed with supercritical CO2", Vibrational Spectroscopy, 1999, vol. 19, pp. 277-283.

(56) References Cited

OTHER PUBLICATIONS

S. Yang et al., "Orientation Distribution Functions Obtained via Polarized Raman Spectroscopy of Poly(ethylene terephthalate) Fibers" Macromolecules, 2003, vol. 36, pp. 6484-6492.
V. Shabafrooz et al. "Measuring Thermal Crystallinity in PET" Materials Science SPE ANTECTM, Indianapolis, 2016, pp. 1-5.
Written Opinion issued Mar. 18, 2021 re: Application No. PCT/EP2021/050480, pp. 1-6, citing: WO 2018/065259 A1 and GB 2 543 495 A.
Japanese Office Action for Application No. 2022-543514, dated Jul. 18, 2024, 8 pages with translation.
Chinese Office Action for Application No. 202180009271.1, dated Mar. 21, 2024, 12 pages with English translation.
Vietnamese Office Action for Application No. 1-2022-03823, dated Feb. 28, 2024, 1 page, English translation.
Japanese Office Action for Application No. 2022-543514, dated Nov. 25, 2024, 5 pages.

* cited by examiner

METHOD FOR THE PRODUCTION AND FILLING OF CONTAINERS DESIGNED TO CONTAIN FOOD

TECHNICAL FIELD

The present disclosure relates to a method for the production and filling of containers designed to contain food.

BACKGROUND

Typically, methods for the production and filling of food provide for the steps of:

- shaping a sheet (usually made of PS or polystyrene) in order to provide a plurality of accommodation receptacles provided with at least one access inlet;
- filling, through the access inlet, the receptacles with at least one food;
- sealing said access inlet by means of a closure film or sheet unwound from a roll;
- cutting, by means of blades or cutters, groups of receptacles;
- providing respective weakened and separation portions at the edges for connection between at least two adjacent accommodation receptacles of the same group.

The step of provision of the weakened portions is also carried out by using blades or cutters, which operate, normally, in order to provide an incision at the connecting edge.

This type of method, as well as the apparatuses used, have two types of drawback:

The use of cutting blades or cutters in order to perform splitting into groups is not particularly flexible and it is quite complex, at the apparatus level, to vary the sizes of the groups or the extension of the weakened portions.

These problems are compounded by others, especially if one wishes to replace PS with PET to provide the containment receptacles.

In fact, in this case, there is a significant reduction in the life of the blades or cutters, with a significant increase in the costs to be incurred.

In addition, when clear or colored PET, which is characterized by considerable toughness, is used as a material, it is practically impossible to create weakened portions that can allow separation between the various receptacles by mutual bending without using scissors or cutters.

In particular, PET in laminar form (i.e., in sheets having a thickness greater than 250 microns) with an initial degree of crystallinity up to 10% is a resilient and tough material and consequently, in order to generate, by scoring with cutters, the weakened portion at a connecting edge between at least two different accommodation receptacles it is necessary to use systems in which the cutters are closer to each other and must score through almost the entire thickness of the material; in spite of this, achievement of the intended purpose is not guaranteed.

Moreover, this aspect causes a shorter life of the cutters for application on PET and consequently a higher cost to be incurred.

Finally, the process becomes difficult to replicate.

Traditionally (see the content of patent GB 2543495), the possibility of increasing the fragility of PET by means of a localized increase in crystallinity induced by the action of laser radiation is known: the thermal effect, an unavoidable consequence of the action of laser radiation on the material struck by it, is in fact responsible for the increase in crystallinity.

It is also known from the literature that crystallization is a process that requires adequate time and temperatures and is induced by long-duration exposure to the action of low-power laser radiation. In this manner the effect of the heating induced by the laser radiation is maximized, so that the crystallization temperature range of PET is reached, without the action of the laser leading to an ablation of the specimen or, if it reaches it, it is obtained while working at low speeds [M. F. Sonnenschein and C. M Roland, *Appl. Phys. Lett.* 57 (5), 1990].

While it is true that an increase in crystallinity, and therefore in fragility, is induced in PET through long-duration exposure to a low-power laser, it is also true that this method is ill-suited for industrial requirements, which increasingly provide for an increase in productivity through a decrease in production times.

SUMMARY

The aim of the present disclosure is to provide a method for the production and filling of containers designed to contain food that is capable of improving the background art in one or more of the aspects mentioned above.

Within this aim, the disclosure provides a method for the production and filling of containers designed to contain food that allows to reduce the maintenance costs of the apparatus.

the disclosure further provides a method for the production and filling of containers designed to contain food that is extremely flexible and allows to vary easily the shape of the groups of mutually connected containers and of the weakened portions.

The disclosure also provides a method for the production and filling of containers designed to contain food that is highly reliable, relatively easy to provide and at competitive costs, and that maintains a high industrial productivity, which is currently characteristic of the manufacture of containers made of PS.

This aim and these and other advantages which will become better apparent hereinafter are achieved by providing a method for the production and filling of containers designed to contain food according to claim 1, optionally provided with one or more of the characteristics of the dependent claims.

BRIEF DESCRIPTION OF THE DRAWINGS

Further characteristics and advantages of the disclosure will become better apparent from the description of a preferred but not exclusive embodiment of the method for the production and filling of containers designed to contain food according to the disclosure, illustrated by way of non-limiting example in the accompanying drawings, wherein.

DETAILED DESCRIPTION OF THE DRAWINGS

Figure 1:
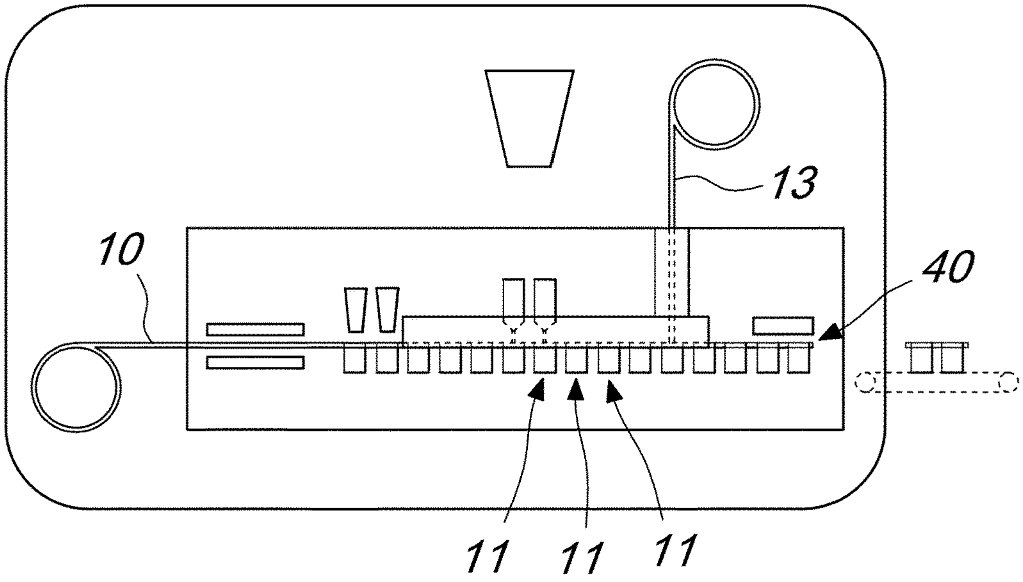
FIG. 1 is a schematic view of an apparatus for the production and filling of containers designed to contain food.
Figure 2:
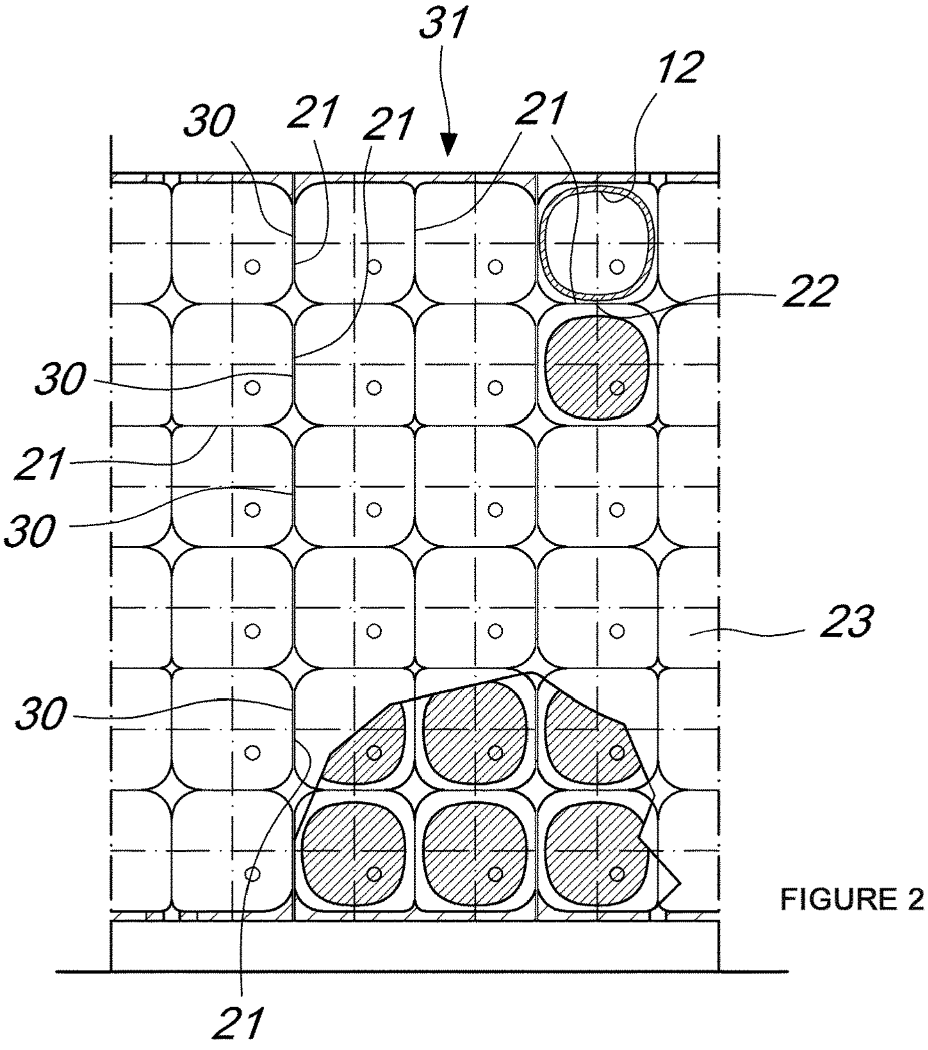
FIG. 2 is a top view of containers provided by means of the method according to the disclosure.
Figure 3:
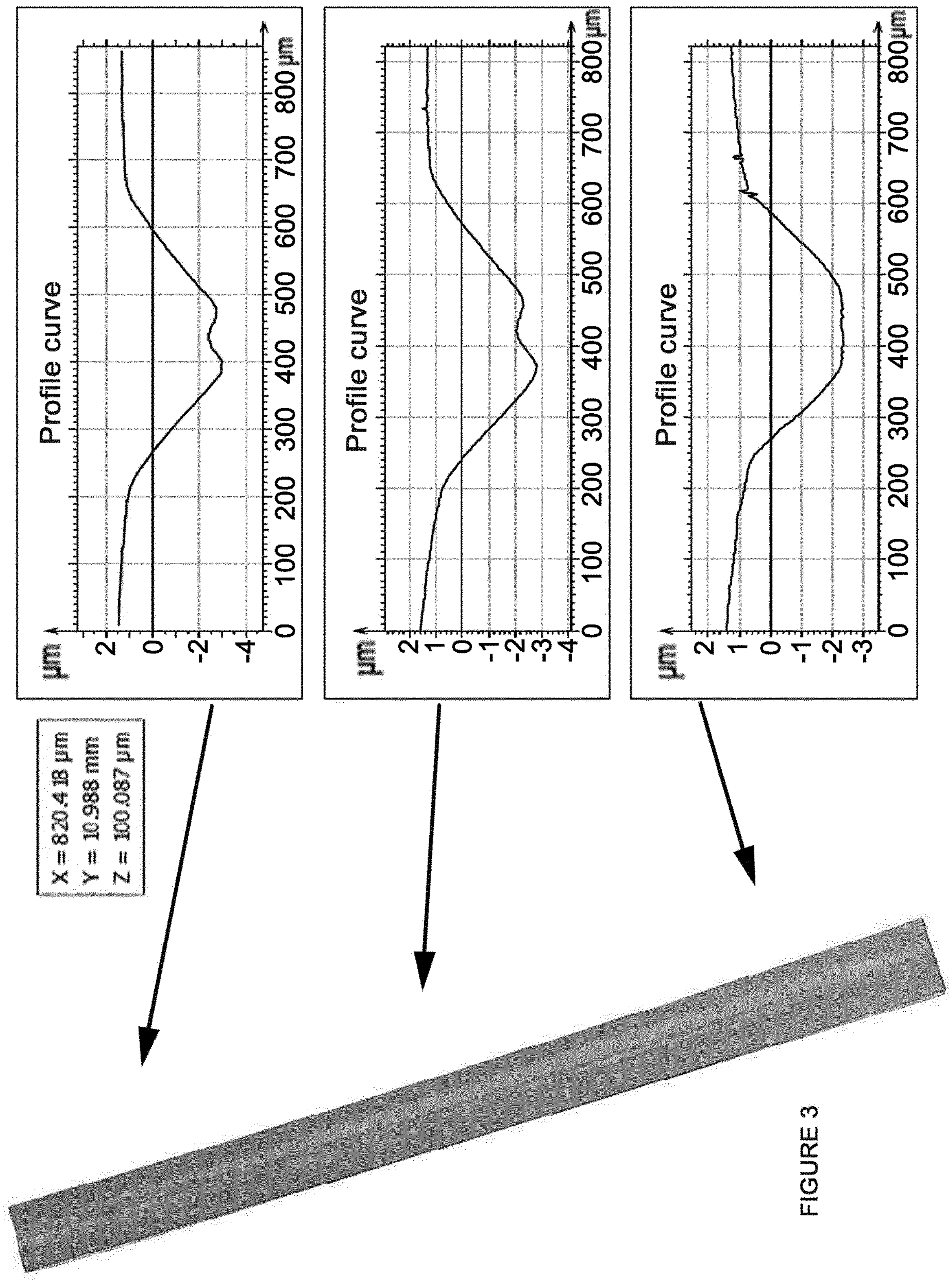
FIG. 3 shows a 3D relief of the surface opposite the surface on which the laser acts, acquired with the Zygo high-definition optical instrument: the reliefs obtained in the three regions of the specimen show that at the weakened portion there are variations of the tensions (induced by the laser emission step) that lead to a recess of the surface.
Figure 4:
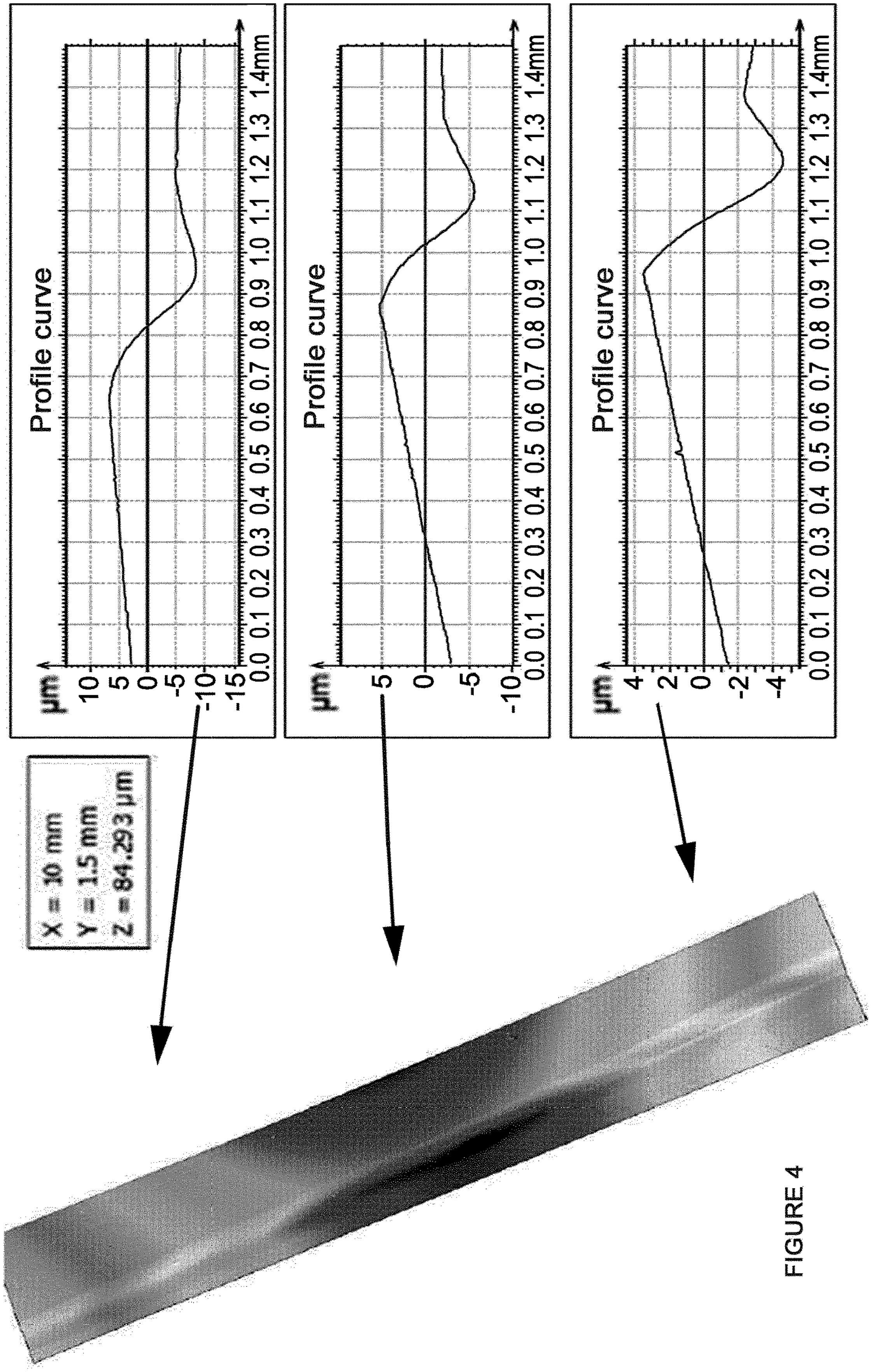
FIG. 4 shows a 3D relief of the surface opposite the surface on which the laser acts, acquired with the Zygo high-definition optical instrument; the reliefs obtained in the three regions of the specimen show that at the weakened portion there are variations of the tensions (induced by the laser emission step) that lead to a misalignment of the surface.
Figure 5:
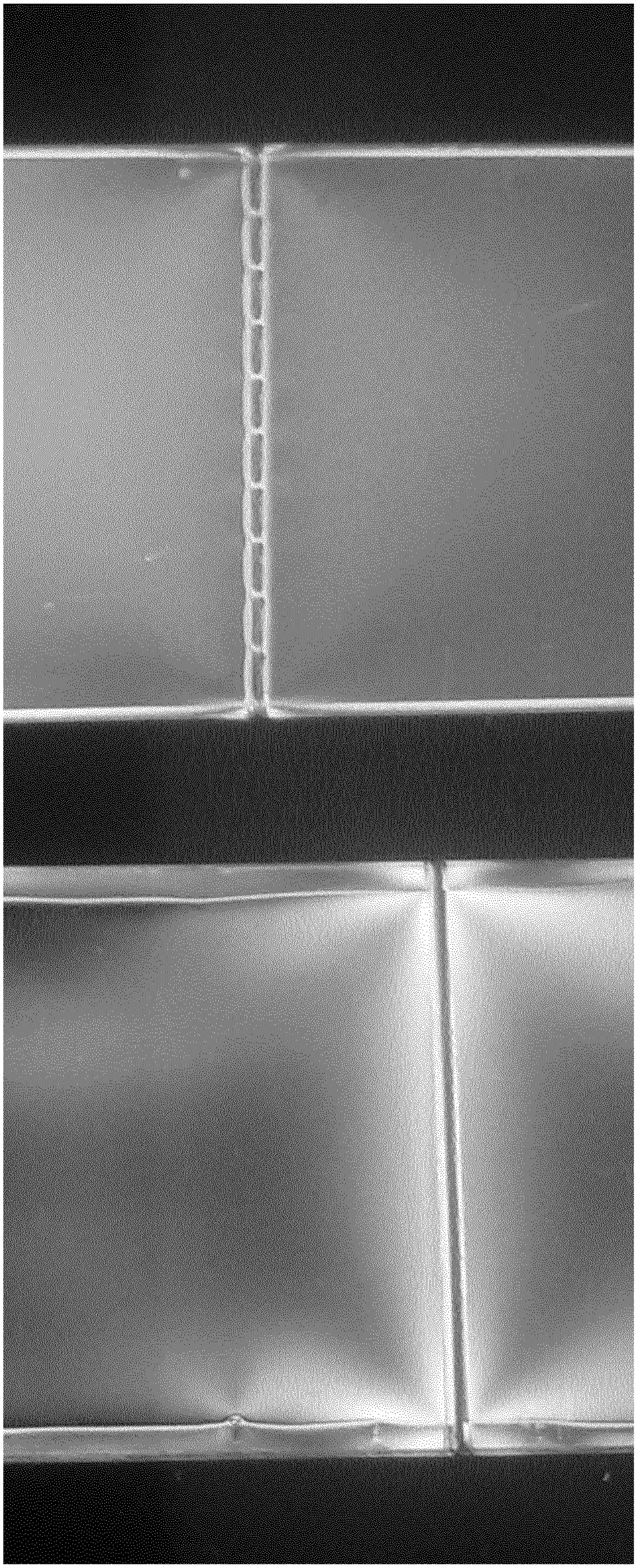
FIG. 5 is a view of specimens on the left with a continuous weakened portion and on the right with a weakened portion with through openings; the specimens are observed with polarized light; a variation of the tension state in the immediate proximity of the laser action, where only the heat and not the laser beam has arrived, is clearly evident.
Figure 6:
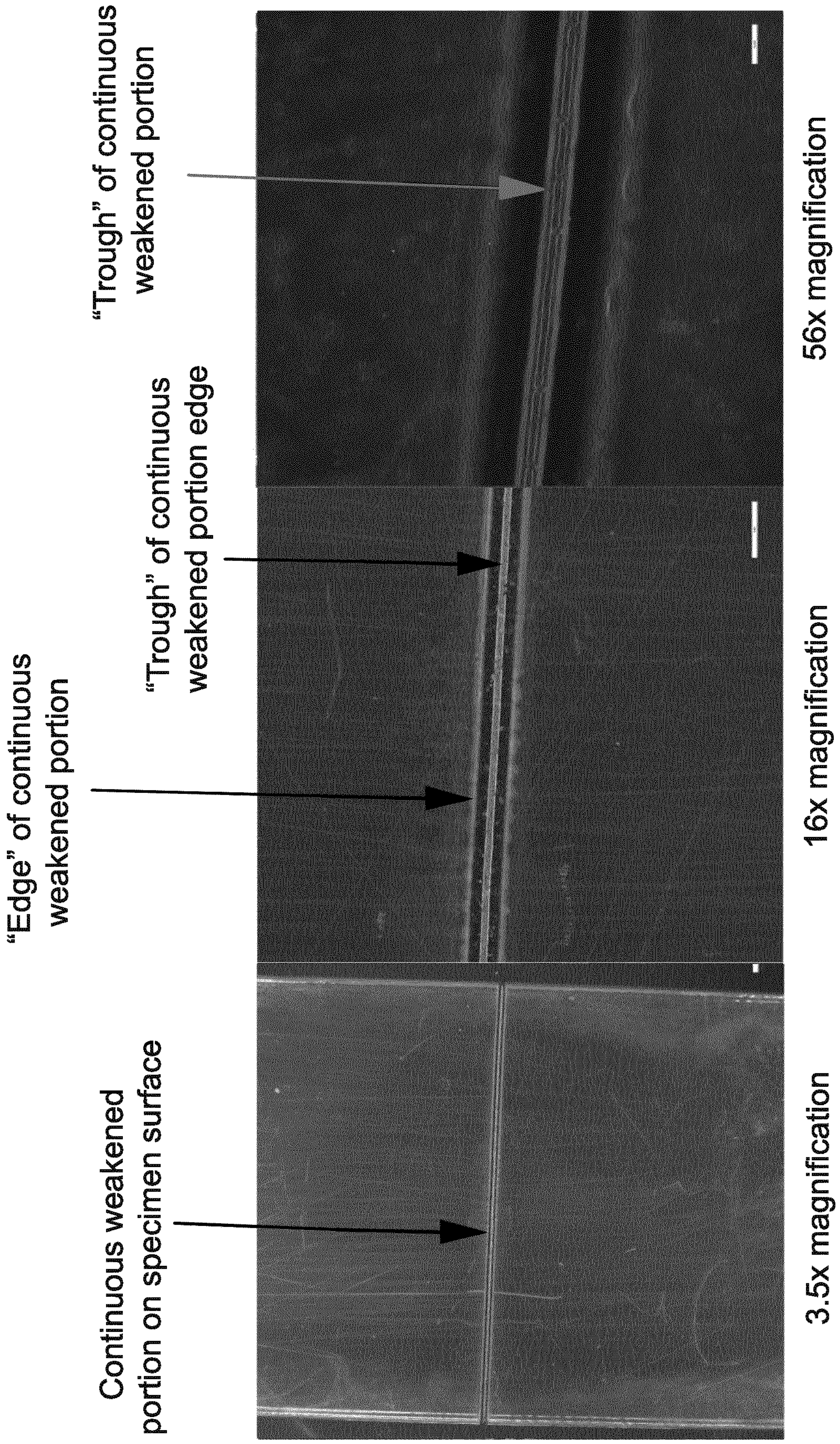
FIG. 6 is a view of three images of the weakened portion on the surface: the image with 3.5× magnification clearly shows the entire incision; the image with 16× magnification shows the edges of the incision and, in the middle, the trough of the incision (object of analysis); the image with 56× magnification shows only the trough of the incision, on which the analyses are to be carried out.
Figure 7:
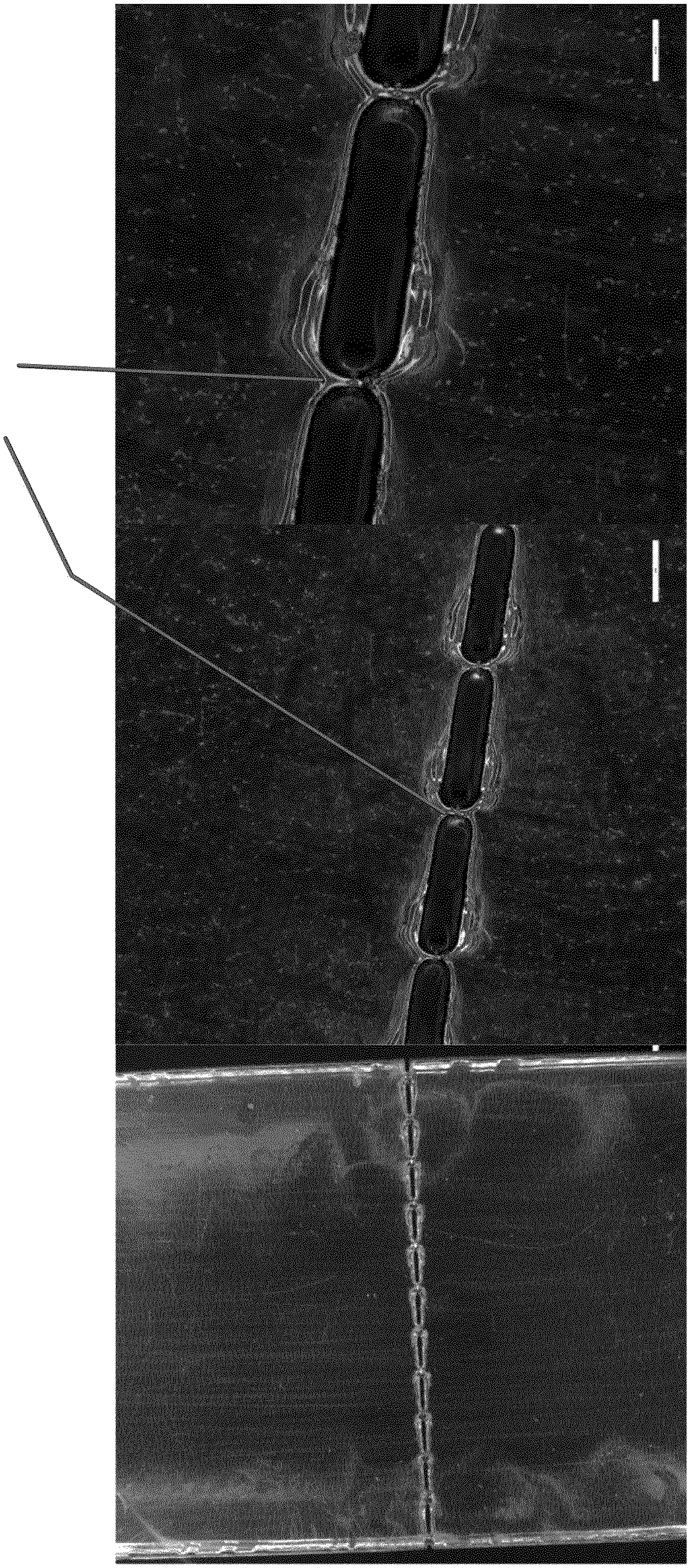
FIG. 7 is a view of three images of the weakened portion on the surface: the image with 3.5× magnification clearly shows the entire incision; the image with 16× magnification shows both the through openings and the "bridge"; the image with 32× magnification shows the "bridge" of the weakened portion is highlighted, on which analysis is to be carried out.
Figure 8:
FIG. 8 is a view of an image of a surface flaw in specimens with known thermal history.
Figure 9:
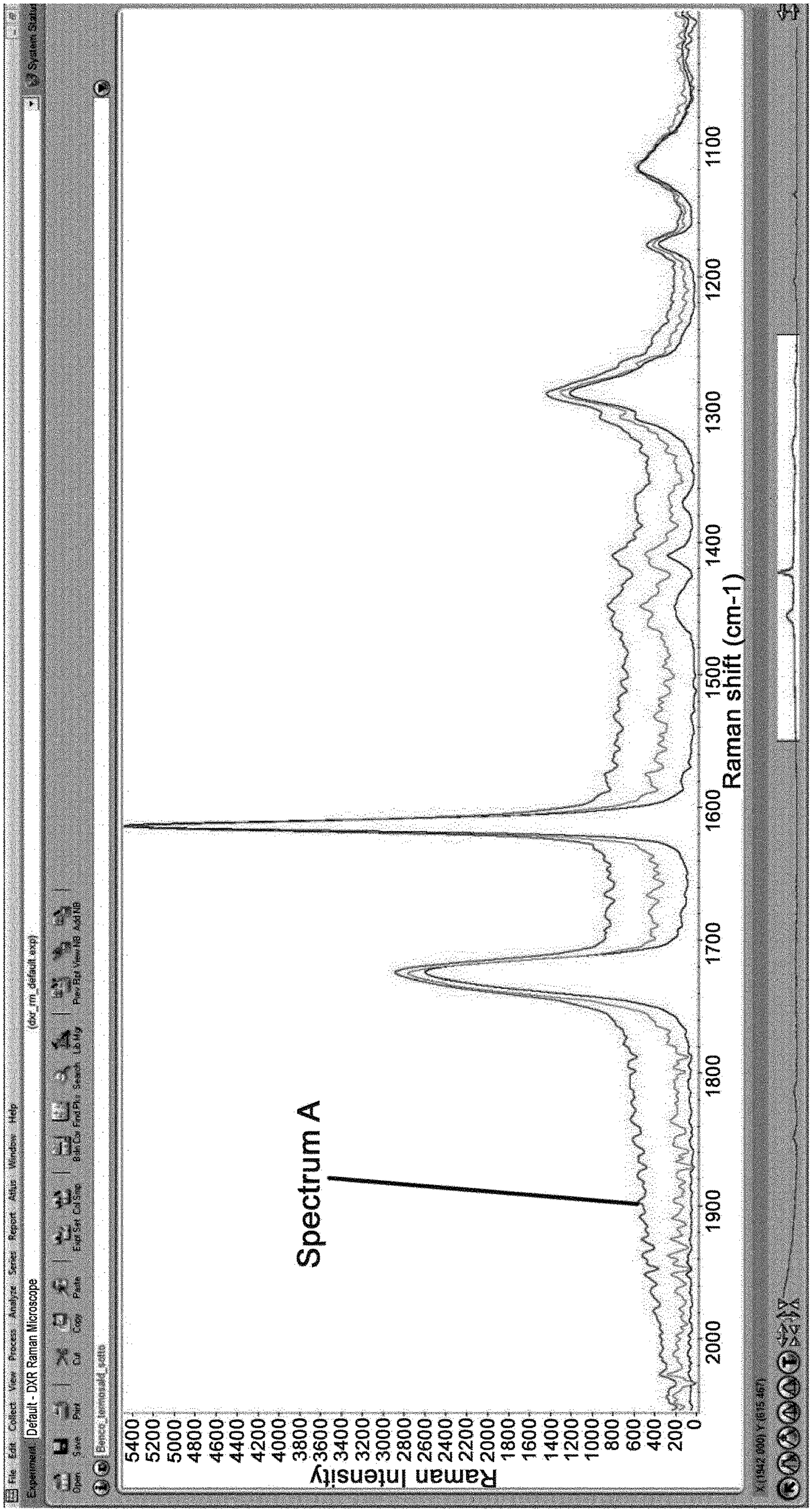
FIG. 9 shows a superimposition of Raman microscopy spectra; the spectrum designated by A has a clear fluorescence signal in the 1000-2050 $cm^{-1}$ range and therefore must be excluded.
Figure 10:
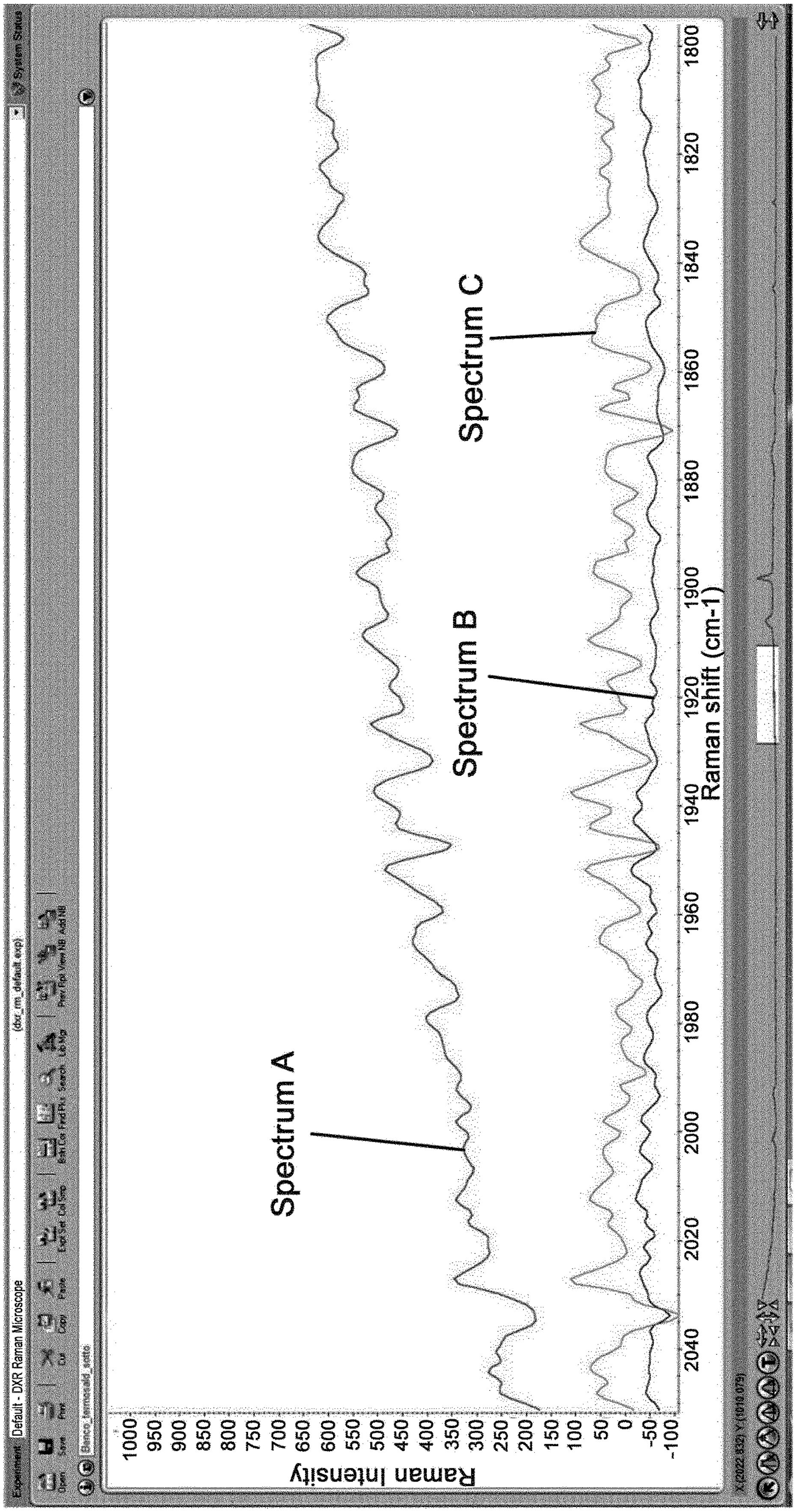
FIG. 10 shows a superimposition of Raman microscopy spectra of the maximum intensity variation in the 1800-2050 $cm^{-1}$ range. The spectrum designated by B is an example of acceptable spectrum, for which the maximum intensity variation is lower than 150; spectrum C is instead not acceptable, since it has a maximum intensity variation greater than 150.
Figure 11:
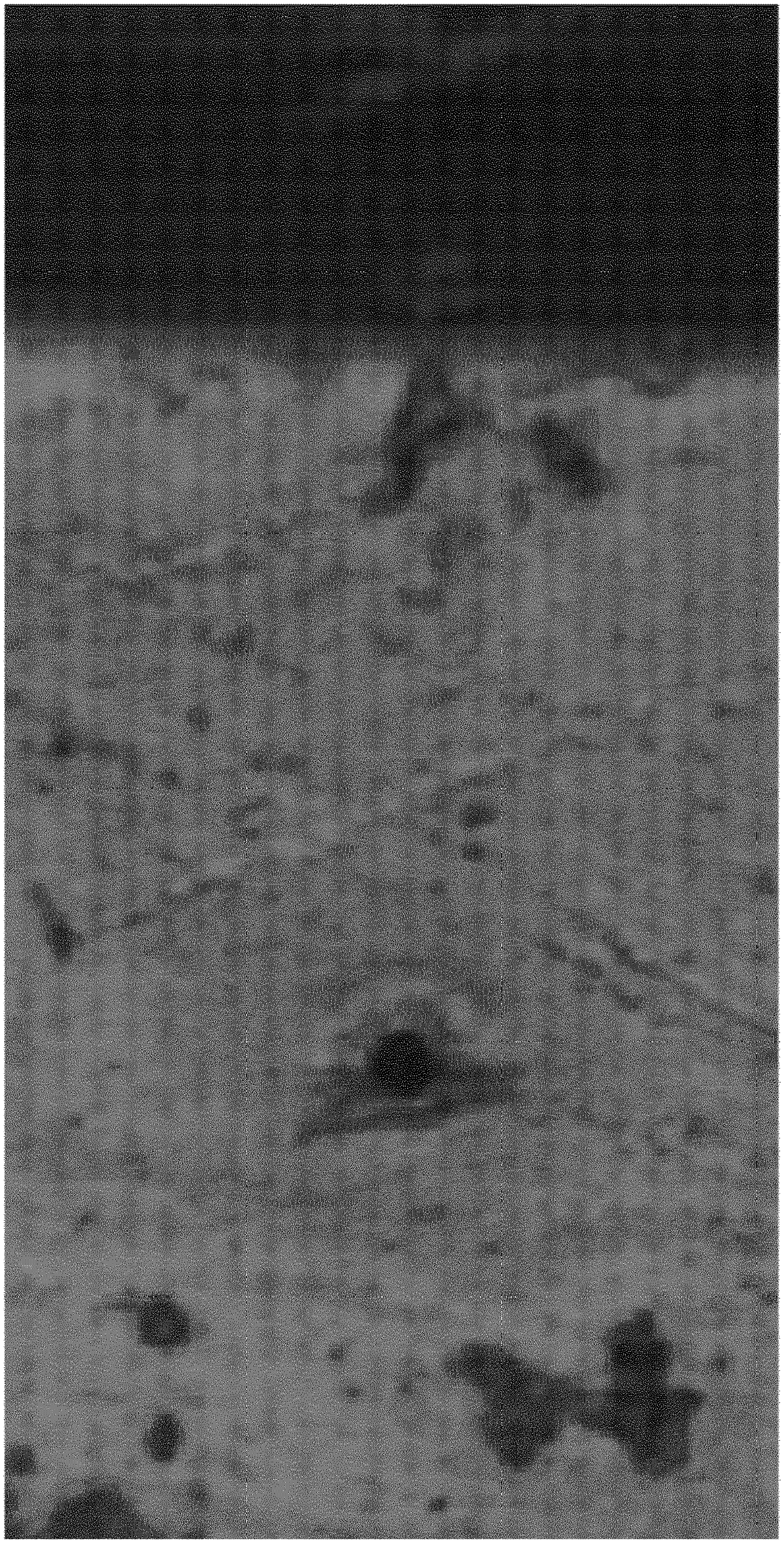
FIG. 11 is an enlarged-scale image of a hole created in the specimen following analysis with Raman microscopy.

With reference to the figures, the method for the production and filling of containers designed to contain food according to the disclosure comprises the steps of:

shaping a sheet 10 made of PET (polyethylene terephthalate) in order to provide a plurality of accommodation receptacles 11 provided with at least one access inlet 12; the sheet made of PET has an initial degree of crystallinity lower than or equal to 10%;

filling, through the access inlet, the receptacles with at least one food;

sealing the access inlet 12 by means of a closure film 13;

provision of a weakened portion 21 at a connecting edge 22 between at least two adjacent accommodation receptacles 11.

In particular, the step of provision of the weakened portion 21 comprises a step of emission of a laser radiation 40 at at least one portion of the connecting edge 22 in order to provide a localized reduction of the transverse cross-section of the connecting edge 22 along the weakened portion 21.

By way of example, the localized reduction of the transverse cross-section is at least equal to 50%, preferably at least equal to 70%, and even more preferably at least equal to 80% with respect to the initial cross-section.

According to the present disclosure, the final degree of crystallinity at the weakened portion 21 after the step of emission of laser radiation 40 is lower than, equal to or greater than, at most by a percentage equal to 3%, the degree of crystallinity of portions of the connecting edge 22 not affected by modifications occurring as a consequence of the step of emission of laser radiation 40 and of the sealing step.

In fact, as will become clear from the tests described in the following, the degree of crystallinity of the portions of the connecting edge 22 not affected by changes occurring as a result of the step of emission of laser radiation 40 and of the sealing step corresponds, substantially, to the degree of crystallinity of the sheet 10.

In practice, the step of emission is performed at a speed and with a power of the laser such as to determine, at the end of said step, at the connecting edge:

a reduction of the degree of crystallinity;

a retention of the same degree of crystallinity; or an increase in the degree of crystallinity at most equal to 3%.

The degree of crystallinity after the emission step is evaluated substantially at the weakened portion 21.

In particular, the step of provision of the weakened portion 21 comprises a step of emission of a laser radiation 40 that originates from a laser having a power at least equal to 250 W.

Advantageously, the laser is emitted at a wavelength absorbed by PET: by way of example, it is possible to use a $CO_2$ laser with a wavelength equal to 10.6 microns, 10.2 microns or 9.3 microns.

The laser emission occurs at at least one portion of the connecting edge 22 in order to provide a localized reduction of the transverse cross-section of the connecting edge 22 along the weakened portion 21.

Localized reduction of the transverse cross-section is understood to mean a reduction of the cross-section of the connecting edge 22 that is substantially constant along the longitudinal extension of the weakened portion 21, but also the provision of a plurality of through openings that pass through the connecting edge and are mutually spaced in order to provide the weakened portion 21.

The reduction of the cross-section along the connecting edge 22 might also provide through openings interleaved by a constant reduction of the thickness or by different thickness reduction sequences.

It has been found surprisingly that although the emission step does not lead to an increase (beyond 3%) in crystallinity, the weakened portion 21 is capable of ensuring an extremely effective breaking along the connecting edge 22 between two adjacent accommodation receptacles 11.

Conveniently, the thickness of the connecting edge 22 on which to perform the step of provision of the weakened portion 21 is comprised between 300 microns and 1800 microns, and more preferably between 700 microns and 1300 microns.

Advantageously, between the sealing step and the step for providing the weakened portion 21 there is a step for separating the accommodation receptacles 11 in groups 31 of accommodation receptacles 11.

Preferably, this separation step is performed by means of a laser beam designed to perform a cut 30 at a connecting edge between the accommodation receptacles 11.

At the end of the method according to the disclosure, one obtains groups (known as multi-packs) 31 of accommodation receptacles 11; respective weakened portions 21 are formed between mutually adjacent accommodation receptacles 11 of the same group 31 and are adapted to allow the separation of each accommodation receptacle 11 from the other accommodation receptacles 11 of the same group 31.

The use of a laser to provide the weakened portions 21 allows the method according to the disclosure to be extremely flexible, since it can be programmed easily should the size of the accommodation receptacles 11 or the shape of the groups 31 change.

The provision step comprises a step of emission of laser radiation which has a power greater than 250 W and preferably lower than 1500 W, at a speed comprised between 15 m/min and 170 m/min, more preferably a power comprised between 300 W and 1200 W, at a speed comprised between 20 m/min and 144 m/min.

In this regard, an attempt has been made to verify whether indeed the control of the operating conditions of use of the laser (in terms of power and speed) could affect, in an experimentally controllable way, the final crystallinity (by determining a reduction, a non-variation or an increase thereof by at most 3%), therefore leading to a reduction in the toughness of the connecting edge in order to identify the optimum operating conditions and parameters, both to obtain extremely facilitated breakage, and implementing a process capable of ensuring sufficient productivity.

For this reason, a series of experimental tests was carried out.

First of all, a study of the variation in the degree of crystallinity of specimens subjected to laser emissions was carried out.

The use of laser radiation with a power greater than 250 W allows, despite not increasing significantly the degree of crystallinity, to change the distribution of the tensions inside the PET, thus obtaining an increase in its fragility.

The extremely rapid action of a powerful laser that acts in a localized manner minimizes the thermal effects and does not alter the regions adjacent to the weakened portions 21, therefore leading to changes in the tensions of the polymeric chains, which make the PET fragile at the weakened portion, even without causing a significant increase in the degree of crystallinity.

The laser acts at the face of the connecting edge 22 that is directed upward, i.e., oppositely with respect to the accommodation receptacle 11.

The method according to the disclosure provides, moreover, for a sterilization step performed upstream or downstream of the thermoforming step.

The method further provides for the execution, at the emission step, of a step of extraction of gases and volatile substances.

This extraction step allows to eliminate gases and volatile substances from the emission region but at the same time makes the action of the laser more efficient.

According to the present disclosure, it is possible to provide for the use of mass dyes or mass pigments which remove, i.e., reduce, transparency from the finished PET sheet.

Moreover, there is nothing to prevent the use of recycled or partially recycled PET.

The present disclosure describes therefore an alternative method for rendering PET fragile without resorting to common methods of crystallization: it is observed in fact that at the weakened portions 21 there is a localized variation of the degree of crystallinity which is no more than a 3% increase with respect to a region on which the laser has not acted.

As already mentioned, this variation in the tensions of the material can be assessed indirectly by using appropriate techniques for surface analysis and observation of specimens with polarized light.

In the literature it is known that the occurrence of deformations in specimens is associable with a variation of the tension state. The acquisition of surface contours carried out using Zygo, a high-definition optical instrument for the detection of 3D surfaces, has allowed to observe that in the specimen surface that is not directly exposed to the action of the laser but is opposite to it, deformations such as indentations or misalignments at the surface can be created at the weakened portions.

Observation under polarized light of the specimens in which the weakened portions have been provided, moreover, has allowed to highlight a variation of the tension state of the material in the immediate vicinity of the action of the laser beam, where only the heat of the radiation has arrived.

In this regard, it has been found experimentally that on the opposite side with respect to the action of the laser, the material that has undergone the thermal effect of the laser tries to reorganize itself, remaining coupled to “cold” material.

The determination of crystallinity in polymers is the subject of many discussions and there are many techniques for determining it.

The techniques of X-ray diffraction and calorimetric analysis based on differential scanning calorimetry (hereinafter also termed “DSC”) are the ones most widely used to determine the degree of crystallinity in polymeric specimens, but problems such as specimen preparation, analysis time, accuracy and complexity in data analysis and, in the case of X-ray diffraction, high cost of the technique, have favored the use of Raman microscopy, a technique which moreover allows faster analysis and is non-destructive.

Raman spectroscopy, however, is not a self-sufficient technique but requires correlation with other methods of measuring crystallinity by constructing a calibration curve [V. Shabafrooz et al. *SPE ANTECTM Indianapolis* 2016].

In the analyses reported below, the technique of Raman spectroscopy on a microscopic scale (hereinafter referred to as “Raman microscopy”) was used, since it is a valid technique for the spot analysis of the specimens, which can be located, moreover, at the weakened portions.

Raman microscopy was then correlated with the DSC calorimetric technique by constructing an appropriate calibration curve having on the axis of abscissas the degree of crystallinity (Xc (%)), calculated by DSC, and on the axis of ordinates the value obtained by Raman microscopy.

Specific specimens with known thermal history were prepared for this purpose.

Calibration curves, as well as specimens with known thermal history, are to be prepared whenever a material with different properties (different intrinsic viscosity (IV), different thickness, different additives, . . . ) is to be studied.

Calorimetric analyses were conducted using Perkin Elmer's DSC 8500 differential scanning calorimeter with CLN2 liquid nitrogen cooling system, Pyris processing software, and direction of endothermic transitions toward positive values of the axis of ordinates. For each analysis, an amount of specimen between 7-15 mg was weighed in manually closed non-hermetic specimen holders. The specimens did not undergo pretreatments prior to the analyses, all of which were conducted in nitrogen flow (20 mL/min).

The instrument was used with the dual purpose of:

1) preparing the specimens with known thermal history for later analysis by Raman microscopy;
2) preparing specimens with known thermal history similar to the previous ones and calculating their degree of crystallinity by DSC calorimetric analysis.

In both cases, the region not affected by the thermoforming of the finished containers was sampled for the preparation of the specimens with known thermal history.

With reference to the dual purpose with which the DSC tool was used, the analysis conditions are differentiated into:

1) for the preparation of specimens with known thermal history to be analyzed by Raman microscopy:
   a. first scan (1 scan): 30° C. to 300° C. at 20° C./min;
   b. isotherm: 1 min at 300° C.;
   c. cooling: 300° C. to 0° C. at X° C./min with X=20; 50; 100; quench obtained by selecting the "ballistic cool to temp" setting; 200.
2) For the preparation of similar specimens with known thermal history to be processed in order to obtain the degree of crystallinity from DSC:
   a. first scan (1 scan): 30° C. to 300° C. at 20° C./min;
   b. isotherm: 1 min at 300° C.;
   c. cooling: 300° C. to 0° C. at X° C./min with X=20; 50; 100; quench obtained by selecting the "ballistic cool to temp" setting; 200;
   d. second scan (2 scan): 0° C. to 300° C. at 20° C./min.

The analysis conditions thus set up allow to eliminate the thermal history of the specimen with the melting due to the first scan. By means of the cooling at controlled and defined speeds (20; 50; 100; quench; 200° C./min) specimens with increasing degrees of crystallinity are obtained as the cooling speed decreases. The specimens for subsequent Raman analyses and the specimens that have also undergone the second heating are therefore to be considered similar for an equal cooling speed. The former were directly analyzed by Raman microscopy, while the latter, in the conditions of analysis, also underwent a second heating from the processing of which the degree of crystallinity by DSC developed during cooling was obtained. This value must be correlated with the Raman microscopy value calculated for its analogous specimen.

Since the processing operations for the calculation of the degree of crystallinity are performed on the second heating, the instrument was calibrated for heatings and coolings at 20° C./minute, as recommended for PET analysis [A. Hammer, *Thermal analysis of polymers. Part 1: DSC of thermoplastics, Mettler Toledo UserCom* 31].

The determination of the degree of crystallinity of specimens with known thermal history by DSC was performed by processing of the second scan (2 scan). The melting and cold crystallization peaks were processed to derive the heat of fusion and crystallization values. The processing was performed in such a way that the integration baseline was consistent with the baseline of the specific thermogram by proceeding as follows: the absolute value of the heat of crystallization (cold crystallization in 2 scan) normalized for the specimen mass (ΔHcc) was subtracted from the heat of fusion normalized for the specimen mass (ΔHf) and the result was matched to the tabulated value of ΔHf° of the PET (140 J/g), which is the theoretical value of the heat of fusion normalized on the mass of 100% crystalline PET, which is determined by indirect methods using the Flory equation described below:

$$Xc \text{ post-cooling } (\%)=(\Delta H_f-|\Delta H_{cc}|)*100/140$$

["Polymer Heat of Fusion", Thermal applications note, R. L. Blaine, G. Ellis et al., *Spectrochimica Acta Part A,* 1995, vol. 51, 2139-2145. The equation used follows. V Shabafrooz et al. *SPE ANTECTM* Indianapolis 2016].

For the spectroscopic analyses, the technique of Raman microscopy was used by using the Thermo Fisher DXR Raman microscope.

With regard to Raman spectroscopy applied to PET, it is known that there are molecular vibrations, active at specific Raman shifts, whose signal has an intensity or shape that depends on the degree of crystallinity of the specimen [S. G. Kazarian, N. H. Brantley, C. A. Eckert, *Vibrational Spectroscopy* 19, 1999, 277-283A Study of Polymer Crystallinity Using the RamanStation 400F, www.perkinelmer.com; J. S. Rossier et al., *Langmuir* 15, 1999, 5173-5178, G. Ellis et al., *Spectrochimica Acta Part A,* 1995, vol. 51, 2139-2145; J. C. Rodriguez-Cabello et al., *Journal of Raman spectroscopy, vol.* 25, 1994, 335-34].

In the tests carried out, the vibration corresponding to the stretching of the carbonyl group, the bandwidth of which decreases as the crystallinity of the analyzed specimen increases, was analyzed.

The width at half-height (Full Width Half Height, FWHH) of the band associated with this vibrational motion, which develops in Raman shift range between 1700 $cm^{-1}$ and 1760 $cm^{-1}$, was calculated [J. C. Rodriguez-Cabello et al., *Journal of Raman spectroscopy*, vol. 25, 1994, 335-34].

As regards the specimens subjected to analysis by means of Raman microscopy, a distinction is made between specimens with known thermal history, prepared in DSC as previously mentioned, and specimens with unknown crystallinity to be determined by interpolation in the calibration curve.

The specimens with unknown crystallinity, in fact, were analyzed on the surface exposed to the laser action, acquiring spectra in at least 3 points of the region of interest: in particular, 3 points in the lower part ("trough") of the incision were analyzed at the continuous weakened portions and 3 points in solid regions, equidistant from the through openings ("bridges"), were analyzed in the weakened portions with through openings. The specimens with known thermal history prepared in DSC were instead analyzed in their cross-section by Raman microscopy by fixing each specimen in the specific holder (kit provided by ThermoFisher) for cross-sectional analysis, so that the planar surfaces of the specimen were fixed to the gripping elements. The specimens were then cut cleanly using the blade (provided by ThermoFisher) to obtain a rectangular section centered with respect to the circular specimen, on which the spectral acquisition was conducted in at least 10 points.

What will be reported on the acquisition of the spectrum and its processing is instead valid for all specimens.

The Raman spectra were recorded by setting the following acquisition mode in the "Omnic for Dispersive Raman" software:

1) in the Collect window of Experiment Setup, the "Autoexposure" option is selected with "Desired S/N" equal to 500, "Maximum collect time (min)" equal to 5 and "Preview exposure time (sec)" equal to 1;
2) in the same Collect window, the final format in which the spectrum will be displayed is also set, in particular "Shifted spectrum ($cm^{-1}$)", in "Correction" the "Fluorescence" option is selected from the drop-down menu and, in the sub-window that opens by clicking once on the word "Fluorescence", "Use polynomial order: 6" is selected, and "Cosmic ray threshold: low" is also selected; in the present disclosure, moreover, the spectra were acquired by choosing the "Use smart background" option, selectable in the same window;
3) in the Bench window of Experiment Setup, 532 nm was selected as "laser wavelength" (for the laser at this wavelength, the instrument must be properly calibrated), "laser power" was set equal to 10 mW (the maximum that can be set for the instrument used), "aperture" was set equal to 25 μm pinhole and the minimum and maximum acquisition ranges in the present disclosure were set from 200 to 3500 $cm^{-1}$. Finally, the 10× lens is to be selected in the Bench window and the lens with that magnification is to be used in the optical module to focus the optical image of the region of interest in order to correctly analyze the selected point. The "grating", "estimated resolution", "estimated spot size" and "allowed range" parameters are not manually modifiable by the operator but depend either on the characteristics of the instrument or on the other parameters set, presented here.
4) For better control of spectral acquisition, it is also recommended to set all the controls on acquisition, which are selectable in the Quality window of Experiment Setup.

In the Atlμs window, using the "Sample Point Tool" function for each specimen, multiple points on which to acquire the spectrum (at least 10 points for specimens with known thermal history and at least 3 points for unknown specimens) were selected. The points must be chosen so that for each point the image is in focus and taking care to avoid surface defects; moreover, for specimens with known thermal history the distance between the points must be almost constant, the sequence must cover the entire length in the longitudinal direction of the rectangular cross-section previously obtained and taking care to avoid bubbles or roughness. Once the points of interest have been selected, it is possible to proceed with the spectral acquisition by means of the "Collect Map" function.

If it is not possible to use the "Sample Point Tool" function or if problems arise in the sequential acquisition of the selected points, it is possible to proceed manually, acquiring one spectrum at a time, it being understood that the general criteria for point acquisition given above apply.

The spectral acquisition mode, as set, interrupts the analysis after five minutes of collection, regardless of whether the desired S/N ratio has been reached. It is therefore necessary to pay attention to the spectrum obtained and take into account that a spectrum cannot be considered acceptable if:

in the Raman Shift range 1000-2050 $cm^{-1}$ it has signals (peaks) or variations of the baseline (linear to curvilinear) due to fluorescence;

in Raman Shift ranges free from peaks that can be associated with the specimen (for example, 1800-2050 $cm^{-1}$) it has a maximum variation of intensity (Raman Intensity), defined as the difference between the absolute maximum and minimum in the selected range, greater than 150 units.

Recommendations if such situations arise are:

check that the analysis area is in focus;

check that the specimen is clean and there is no dust or grease that might interfere with the analysis;

change the point of analysis.

It is also possible that following Raman microscopy analysis a hole is created at the analyzed point. This phenomenon can be observed by means of the Atlμs window and, in any case, is reported by the software in the "Collect Status" window as "The sample is burning". In this case it is necessary to change the analysis point.

For the processing of the spectra obtained by Raman we proceeded as follows:

1) in the spectrum, the region comprised between 1820 and 1640 $cm^{-1}$ was selected and the Peak Resolve function in Analyze was chosen;
2) in the analysis window opened by means of the Peak Resolve function, analysis was carried out by means of the Gaussian/Lorentzian function [J. C. Rodriguez-Cabello et al., *Journal of Raman spectroscopy*, vol. 25, 1994, 335-344; S. Yang, S Michielsen, *Macromolecules* 36, 2003, 6484-6492, with "sensitivity high", "noise target" of 0.5 and linear "baseline"];
3) once the 1780-1680 $cm^{-1}$ range had been selected, the FWHH value was calculated by clicking the appropriate button.

For all specimens, the averages of the FWHH values obtained were then calculated (average over 3 points for specimens with unknown crystallinity and average over at least 10 points for specimens with known thermal history) and used in the manner consistent with each specimen:

1) the averages of the FWHHs of the specimens with known thermal history were used to construct the calibration curve;
2) the averages of the FWHHs of the specimens with unknown crystallinity were interpolated on the calibration curve in order to derive their degree of crystallinity.

The development of the presented method of analysis has allowed to analyze points of interest of the specimen in order to verify that the step of emission of laser radiation, in the weakened portion, determined a localized variation of the degree of crystallinity not exceeding 3% with respect to the degree of crystallinity of a reference.

By degree of crystallinity of a reference one means:

CASE A) the degree of crystallinity of the non-thermoformed PET sheet;

CASE B) the degree of crystallinity of a semicircular portion of the finished container identified as follows:

1) At least 0.6 mm distant from the through cut;
2) At least 0.3 mm distant from the weakened portion;
3) At least 0.3 mm distant from the heat seal;

CASE C) less preferably, the degree of crystallinity at the heat-sealing ring of the finished container.

The heat-sealing ring is included among the references because it has been shown to be representative of the non-thermoformed region of a PET container, since the sealing operation does not change the degree of crystallinity of PET.

EXAMPLE 1

Pot 1—thickness 1.2 mm

With the pot 1, with a thickness of 1.2 mm in the region not directly subjected to the thermoforming action, a calibration curve was constructed which is valid only for the case under examination by preparing specimens with known thermal history obtained from the non-thermoformed and non heat-sealed part of the pot 1.

The specimens with known thermal history were prepared by DSC according to the methods presented hereafter:

I. for the preparation of the specimens with known thermal history to be analyzed by Raman microscopy:
a. first scan (1 scan): from 30° C. to 300° C. at 20° C./min;
b. isotherm: 1 min at 300° C.;
c. cooling: from 300° C. to 0° C. at X° C./min with X=20; quench obtained by selecting the "ballistic cool to temp" setting; 200.

II. For the preparation of similar specimens with known thermal history to be processed in order to obtain the degree of crystallinity from DSC:
a. first scan (1 scan): from 30° C. to 300° C. at 20° C./min;
b. isotherm: 1 min at 300° C.;
c. cooling: from 300° C. to 0° C. at X° C./min with X=20; quench obtained by selecting the "ballistic cool to temp" setting; 200;
a. second scan (2 scan): from 0° C. to 300° C. at 20° C./min.

The determination of the degree of crystallinity of the specimens with known thermal history by DSC was carried out by processing the second scan (2 scan) so as to calculate its degree of crystallinity due to the cooling step at defined speed. The thermogram of the second scan was considered for this processing. The values of the heat of fusion (ΔHf) and of cold crystallization (ΔHcc) normalized for the mass of the specimen were obtained by integrating the exothermic peak due to cold crystallization and the endothermic peak due to fusion by setting the "Standard" linear integration baseline. The fusion and cold crystallization peaks were processed so that the integration baseline was consistent with the baseline of the specific thermogram. With this principle, regarding only the cases presented in this example, the fusion peaks were processed in the temperature range 210° C.-262° C. and the cold crystallization peaks in the temperature range 137° C.-183° C. In the case of the specimen subjected to cooling at 20° C./min, the thermogram did not show the peak due to cold crystallization in the second heating.

Figure 12:
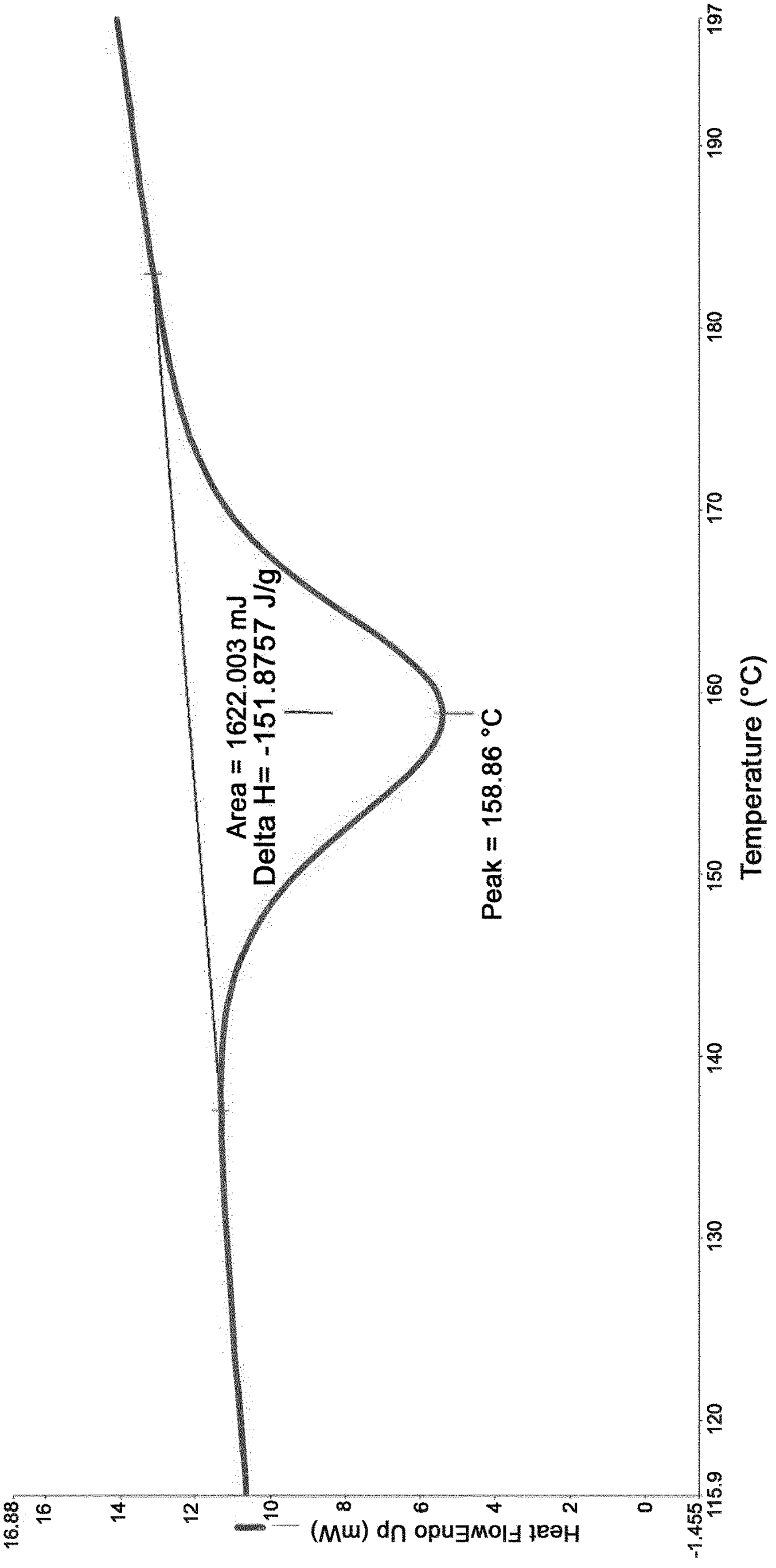
FIG. 12 shows an example of processing of the cold crystallization peak in the second scanning of the calorimetric analysis.
Figure 13:
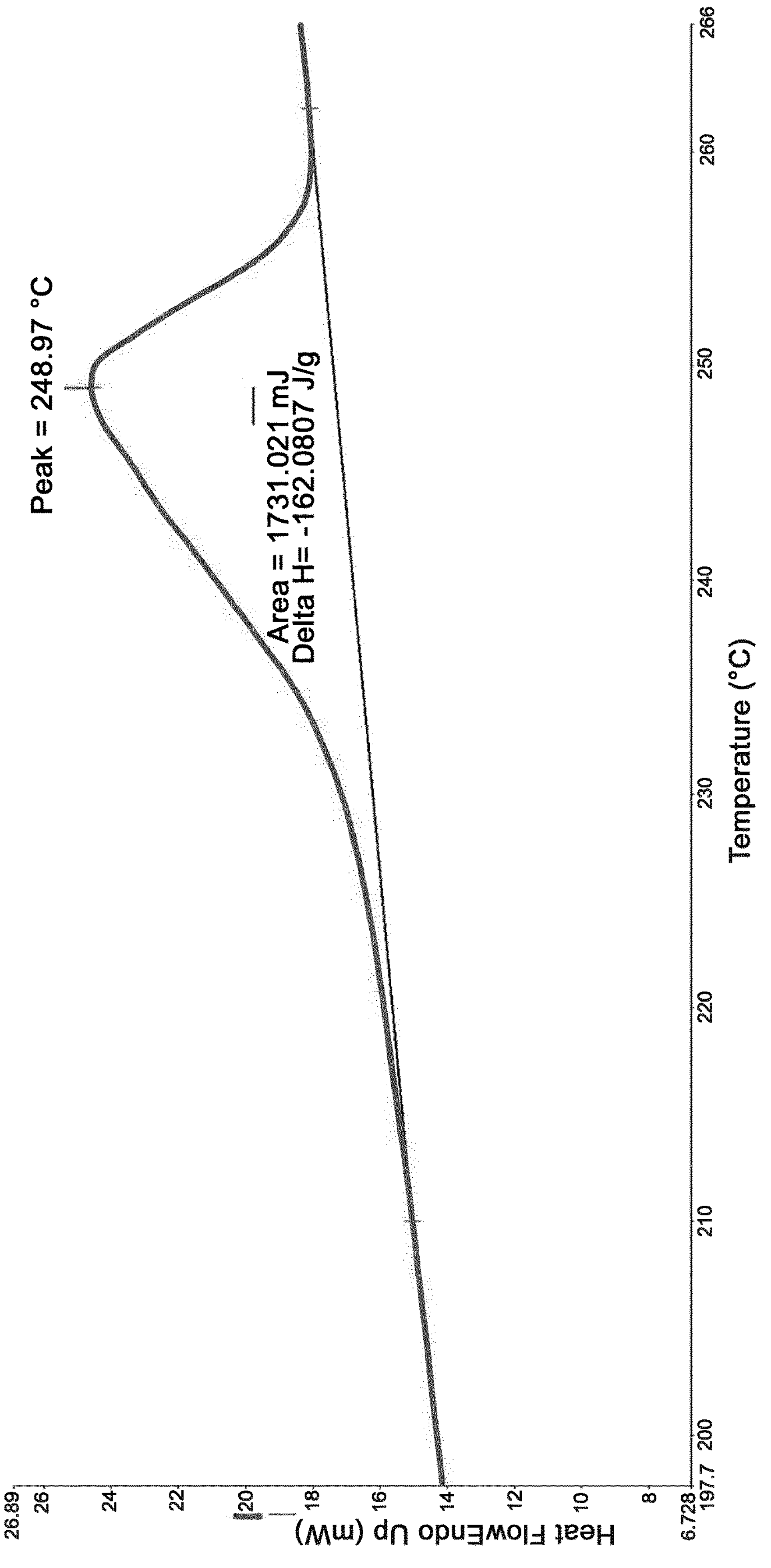
FIG. 13 shows an example of processing of the melting peak in the second scanning of the calorimetric analysis.

FIGS. 12 and 13 show thermograms for typical processing of cold crystallization and fusion peaks.

In particular, FIG. 12 is an example of processing of the cold crystallization peak in the second scan of the calorimetric analysis, while FIG. 13 is an example of the processing of the fusion peak in the second scan of the calorimetric analysis.

For each calorimetric analysis considered, the following formula was applied:

$$Xc \text{ post-cooling } (\%)=(\Delta H_f-|\Delta H_{cc}|)*100/140$$

thus deriving the degrees of crystallization from calorimetric analysis (DSC) for the specimens with known thermal history.

Figure 14:
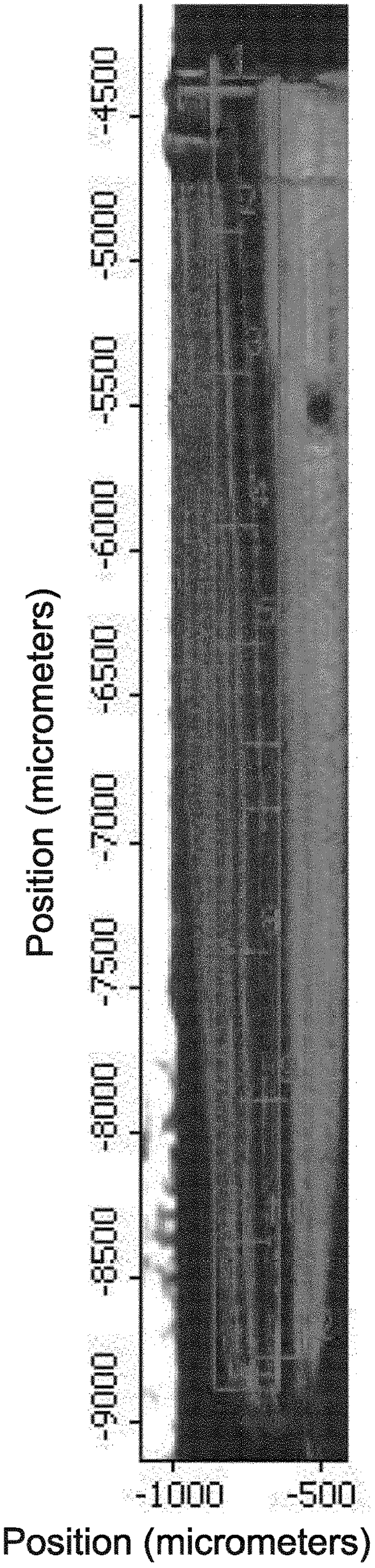
FIG. 14 shows an example of cross-sectional analysis of the specimens with known thermal history.

The specimens with known thermal history prepared for Raman microscopy analysis were appropriately sectioned and inserted in the appropriate specimen holder in order to acquire at least 10 spectra in the longitudinal direction of the section (FIG. 14).

Figure 15:
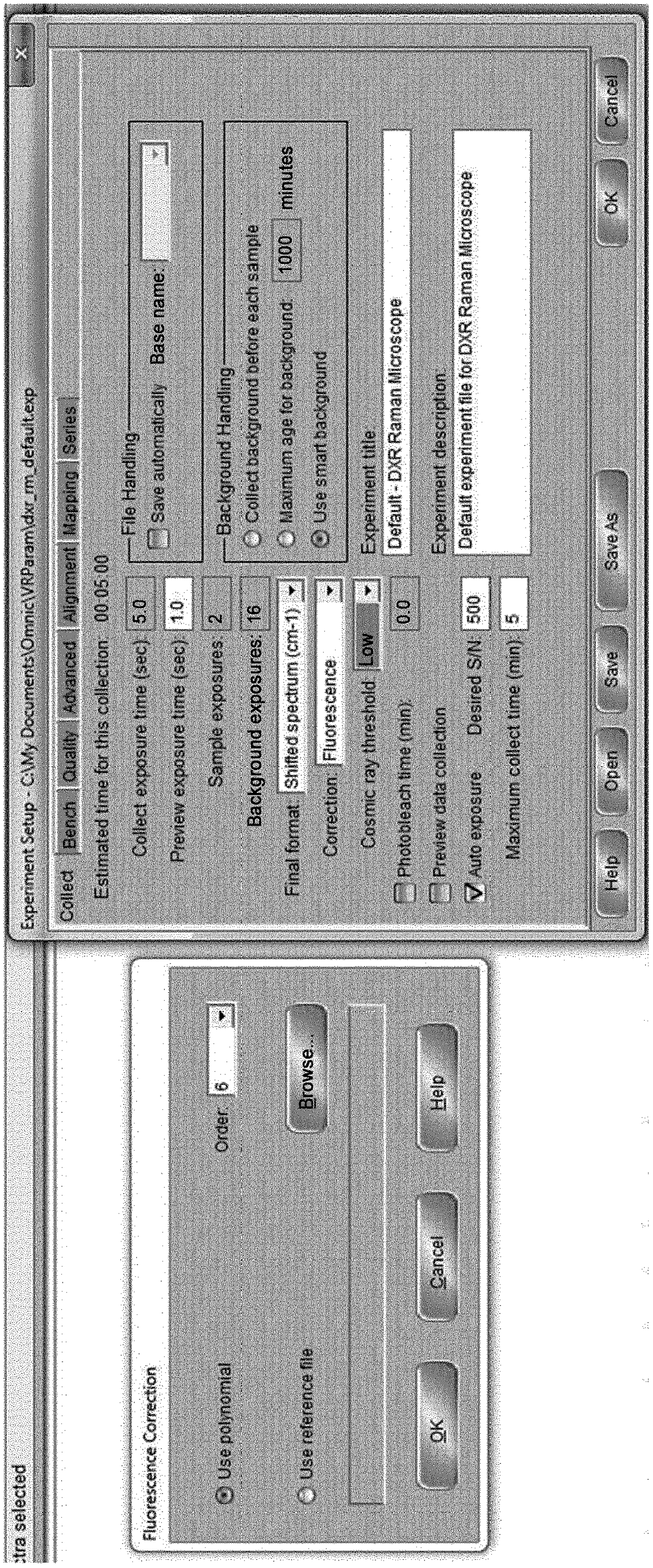
FIGS. 15 and 16 and 17 show the analysis conditions set in the Omnic software for the acquisition of Raman spectra, further detailed in the description.
Figure 16:
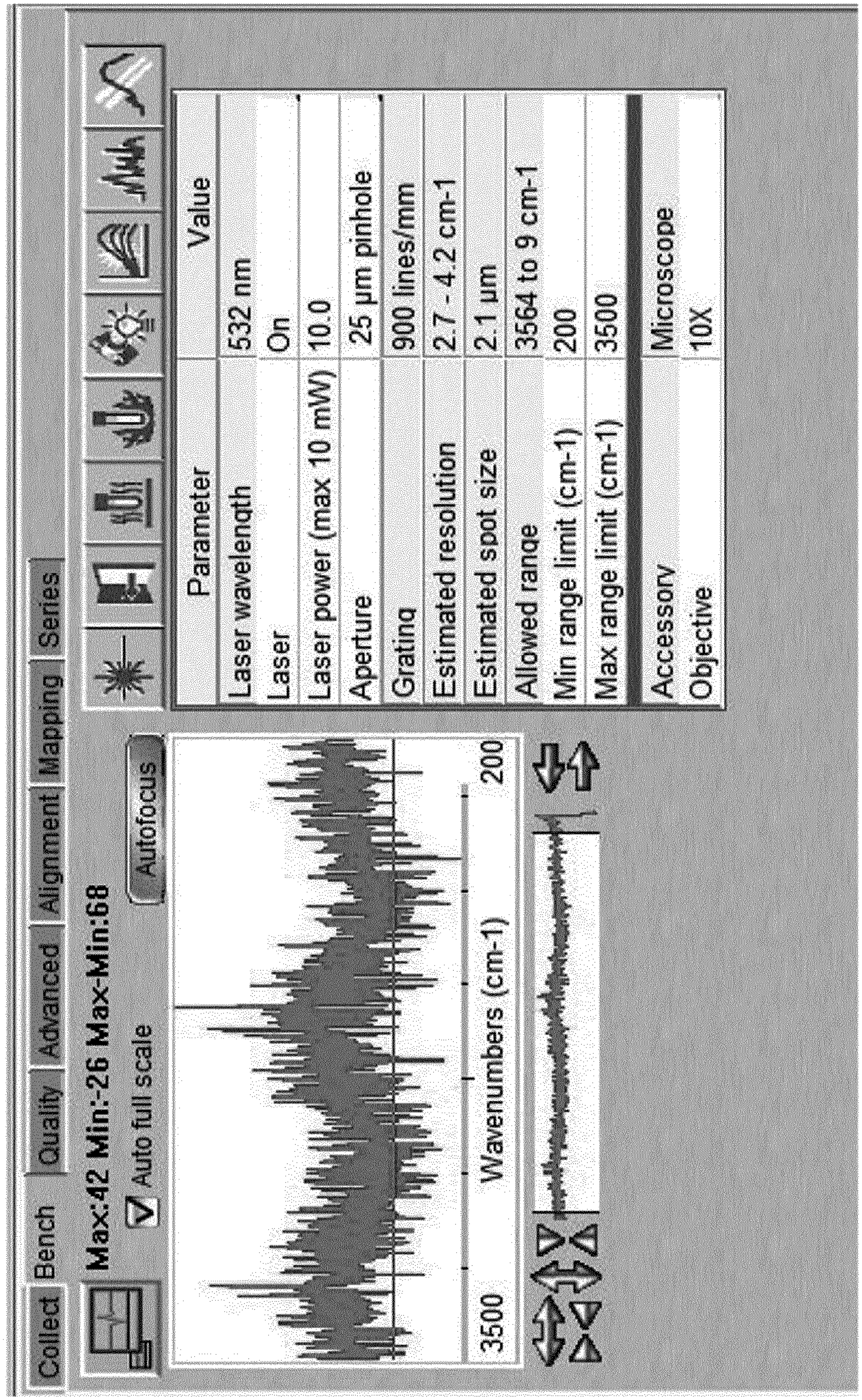
Figure 17:
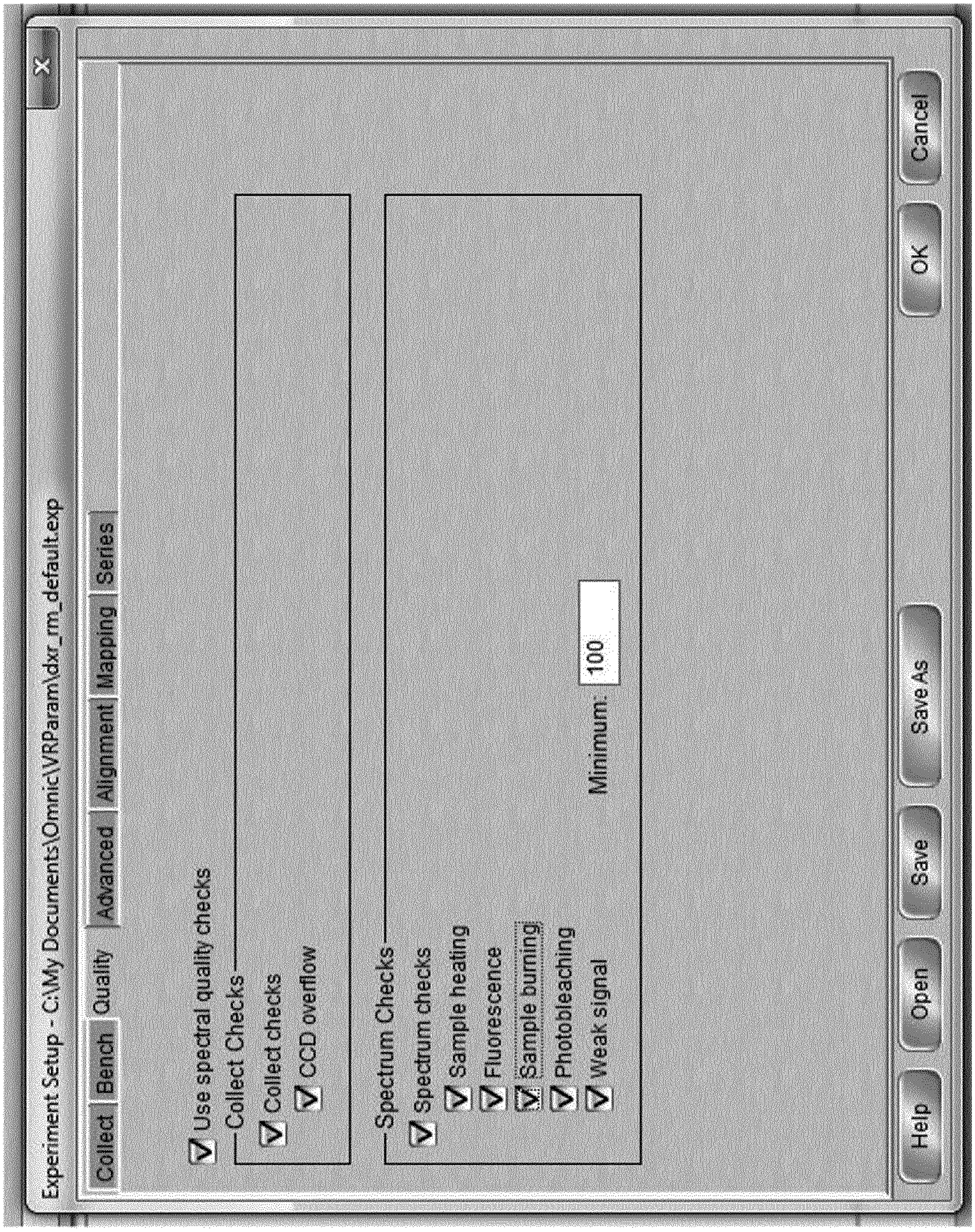

FIGS. 15, 16 and 17 show the images of the set analysis conditions, reported descriptively in the previous chapters.

Figure 18:
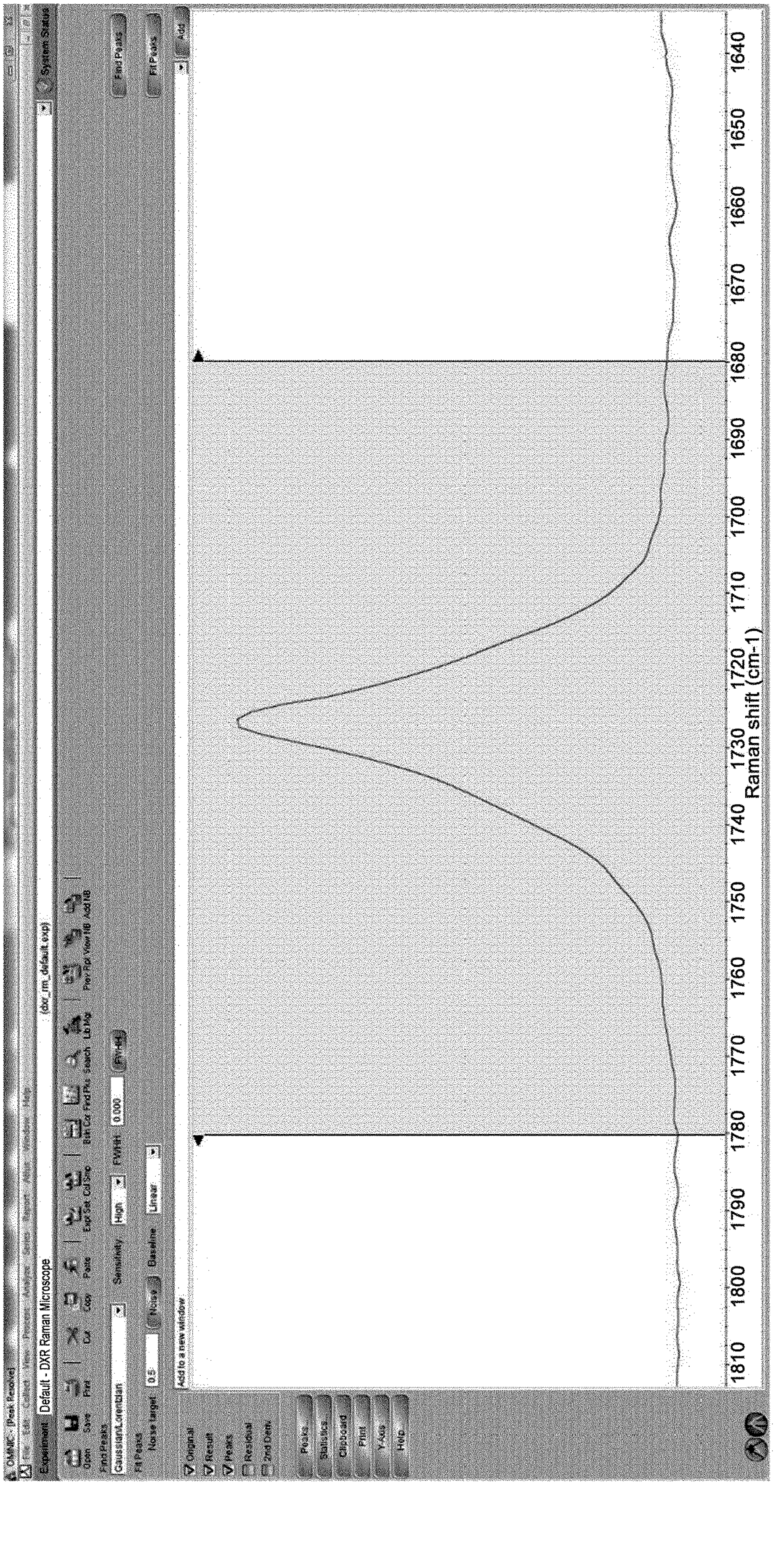
FIG. 18 shows an example of analysis of a Raman spectrum by means of the Peak Resolve function, according to the methods detailed in the description.

FIG. 18 shows an example of processing of the spectra acquired in the manner described in the previous chapters.

Following the processing of each spectrum, the average of the FWHH values obtained was calculated for each specimen. These values were used to construct the axis of ordinates of the calibration curve, which is specific to pot 1, together with the degrees of crystallinity of the homologous specimens obtained by processing the respective thermograms and used to construct the axis of the abscissas.

The points of the chart were then processed by means of a linear trend line, the equation of which was used for the subsequent interpolations of the FWHH values of specimens of unknown crystallinity originating from said pot 1 (and not from others).

Figure 19:
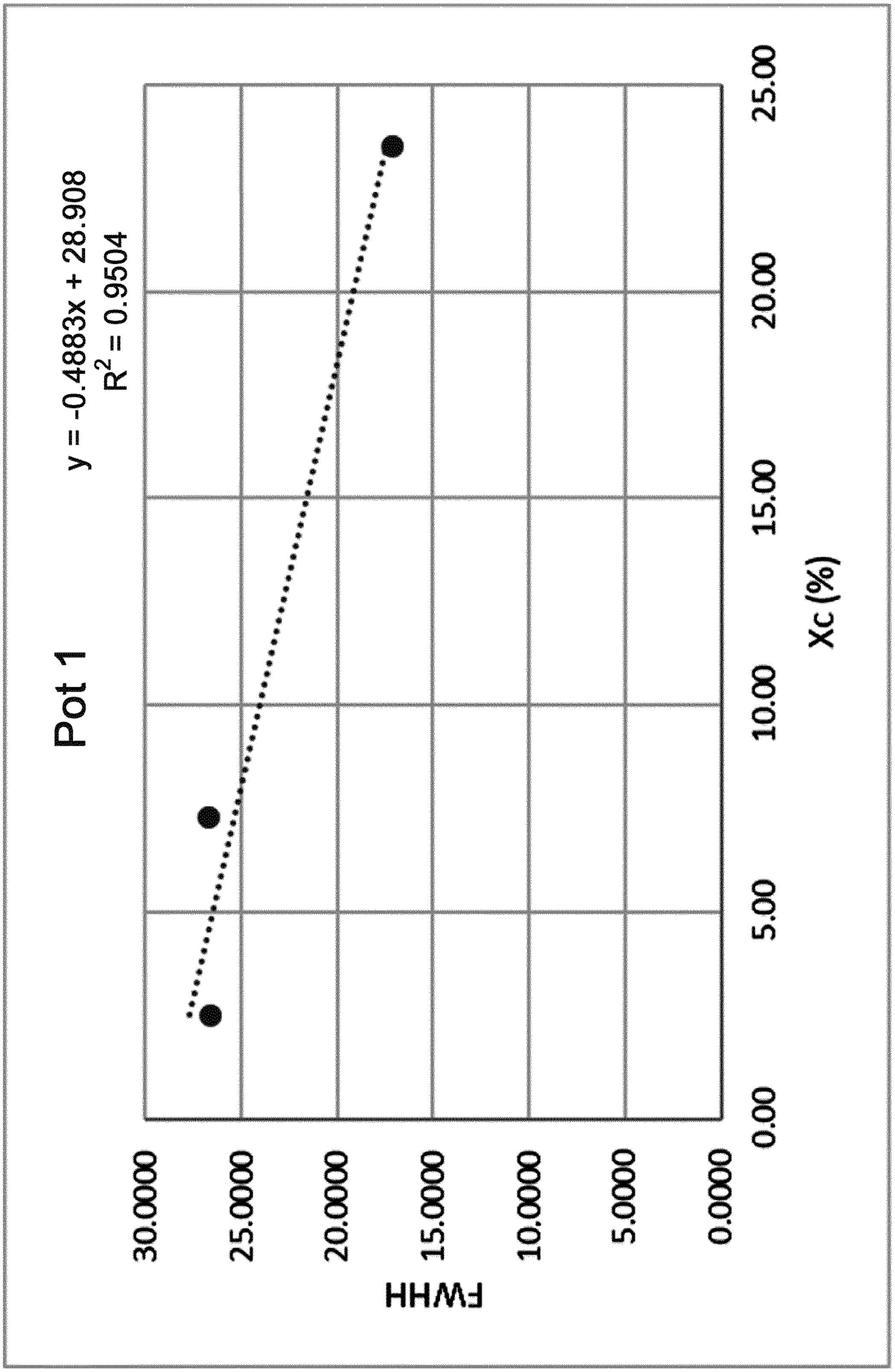
FIG. 19 shows the straight calibration line processed for pot 1, comprising the equation of the straight line and the value of $R^2$.

FIG. 19 shows the straight calibration line, including the equation, for pot 1.

TABLE 1

Values calculated by DSC and Raman microscopy for the construction of the calibration curve. Pot 1

| Cooling rate in DSC (° C./min) | Average FWHH from Raman | Xc (%) from DSC |
|---|---|---|
| 20 | 17.1287 | 23.493 |
| Quench | 26.6429 | 2.500 |
| 200 | 26.7025 | 7.286 |

Since the initial PET sheet was not available, in the pot 1 specimen the reference region was located in a semicircular portion of the finished pot:

At least 0.6 mm away from the through cut;

At least 0.3 mm away from the weakened portion;

At least 0.3 mm away from the heat-sealed region.

In the portion thus identified, 3 spectra were acquired using a Raman microscope (the methods for acquiring the spectra and the corresponding processing were carried out as described above for the Raman microscopy technique) and the average of the FWHH values was calculated. The average FWHH value was then interpolated in the straight calibration line constructed for pot 1. This operation allowed to calculate the degree of crystallinity for the reference of pot 1.

TABLE 2

Reference portion of pot 1. The equation of the straight calibration line related to Pot 1 was used to calculate Xc (%).

| Pot 1 | FWHH from Raman | Xc (%) from interpolation | FWHH AVERAGE from Raman | Xc AVERAGE (%) from interpolation |
|---|---|---|---|---|
| Ref point 1 | 26.310 | 5.320 | 26.346 | 5.246 |
| Ref_point2 | 26.163 | 5.622 | | |
| Ref_point3 | 26.566 | 4.796 | | |

Continuous Weakened Portion a) A laser with 300 W of power and a speed equal to 21 m/min was used.

The spectra were acquired by Raman microscopy, analyzing the surface of the specimen at the lower part of the weakened portion (known as "trough").

TABLE 3

Raman microscopy on the trough of the continuous weakened portion. The data refer to a laser emission step with 300 W of power and a speed of 21 m/min. For the calculation of Xc (%), the equation of the straight calibration line related to Pot 1 was used.

| Pot 1 Weakened portion | FWHH from Raman | Xc (%) from interpolation | FWHH AVERAGE from Raman | Xc AVERAGE (%) from interpolation |
|---|---|---|---|---|
| Trough_point1 | 26.215 | 5.515 | 26.129 | 5.692 |
| Trough_point2 | 26.189 | 5.568 | | |
| Trough_point3 | 25.982 | 5.992 | | |

The average value of Xc (%) at the trough of the weakened portion was compared with the average value of Xc (%) of the reference by setting the formula ΔXc (%)=weakened portion Xc (%)–"reference" Xc (%).

TABLE 4

Variation in the degree of crystallinity between Xc (%) in the weakened portion and Xc (%) of the previously defined "reference".

| Ref Pot 1-Xc AVERAGE (%) from interpolation | Weakened portion Xc AVERAGE (%) from interpolation | AXc (%) = weakened portion Xc (%) − reference Xc (%) |
|---|---|---|
| 5.246 | 5.692 | 0.446 |

b) A laser with 750 W of power and a speed of 77 m/min was used.

The spectra were acquired by Raman microscopy, analyzing the surface of the specimen at the lower part of the weakened portion (known as "trough").

TABLE 5

Raman microscopy on the trough of the continuous weakened portion. The data refer to a laser emission step with 750 W of power and a speed of 77 m/min. For the calculation of Xc (%), the equation of the straight calibration line related to Pot 1 was used.

| Pot 1 Weakened portion | FWHH from Raman | Xc (%) from interpolation | FWHH AVERAGE from Raman | Xc AVERAGE (%) from interpolation |
|---|---|---|---|---|
| Trough_point1 | 26.355 | 5.228 | 26.403 | 5.130 |
| Trough_point2 | 26.485 | 4.962 | | |
| Trough_point3 | 26.369 | 5.200 | | |

The average value of Xc (%) at the trough of the weakened portion was compared with the average value of Xc (%) of the reference by setting the formula ΔXc (%)=weakened portion Xc (%)–"reference" Xc (%).

TABLE 6

Variation in the degree of crystallinity between Xc (%) in the weakened portion andXc (%) of the previously defined "reference".

| Ref Pot 1-Xc AVERAGE (%) from interpolation | Weakened portion Xc AVERAGE (%) from interpolation | AXc (%) = weakened portion Xc (%) − reference Xc (%) |
|---|---|---|
| 5.246 | 5.130 | −0.116 |

c) A laser with 1200 W of power and a speed of 124 m/min was used.

The spectra were acquired by Raman microscopy, analyzing the surface of the specimen at the lower part of the weakened portion (known as "trough").

TABLE 7

Raman microscopy on the trough of the continuous weakened portion. The data refer to a laser emission step with 1200 W of power and a speed of 124 m/min. For the calculation of Xc (%), the equation of the straight calibration line related to Pot 1 was used.

| Pot 1 Weakened portion | FWHH from Raman | Xc (%) from interpolation | FWHH AVERAGE from Raman | Xc AVERAGE (%) from interpolation |
|---|---|---|---|---|
| Trough_point1 | 26.423 | 5.089 | 26.329 | 5.282 |
| Trough_point2 | 26.394 | 5.148 | | |
| Trough_point3 | 26.169 | 5.609 | | |

The average value of Xc (%) at the trough of the weakened portion was compared with the average value of Xc (%) of the reference by setting the formula ΔXc (%)=weakened portion Xc (%)−"reference" Xc (%).

TABLE 8

Variation in the degree of crystallinity between Xc (%) in the weakened portion and Xc (%) of the previously defined "reference".

| Ref Pot 1-Xc AVERAGE (%) from interpolation | Weakened portion Xc AVERAGE (%) from interpolation | ΔXc (%) = weakened portion Xc (%) − reference Xc (%) |
|---|---|---|
| 5.246 | 5.282 | 0.036 |

Weakened Portion Provided with Through Openings a) A laser with 300 W of power and a speed of 20 m/min was used.

The spectra were acquired by Raman microscopy, analyzing the surface of the specimen at three solid regions of the weakened portion (known as "bridges"), at points substantially equidistant from the through openings.

TABLE 9

Raman microscopy on the bridges of the weakened portion provided with through openings. The data refer to a laser emission step with 300 W of power and a speed of 20 m/min. For the calculation of Xc (%), the equation of the straight calibration line related to Pot 1 was used.

| Pot 1 Weakened portion | FWHH from Raman | Xc (%) from interpolation | FWHH AVERAGE from Raman | Xc AVERAGE (%) from interpolation |
|---|---|---|---|---|
| Bridge_point1 | 26.514 | 4.903 | 26.496 | 4.939 |
| Bridge_point2 | 26.648 | 4.628 | | |
| Bridge_point3 | 26.327 | 5.286 | | |

The average value of Xc (%) at the trough of the weakened portion was compared with the average value of Xc (%) of the reference by setting the formula ΔXc (%)=weakened portion Xc (%)−"reference" Xc (%).

TABLE 10

Variation in the degree of crystallinity between Xc (%) in the weakened portion and Xc (%) of the previously defined "reference".

| Ref Pot 1-Xc AVERAGE (%) from interpolation | Weakened portion Xc AVERAGE (%) from interpolation | ΔXc (%) = weakened portion Xc (%) − reference Xc (%) |
|---|---|---|
| 5.246 | 4.939 | −0.307 |

b) A laser with 750 W of power and a speed of 45 m/min was used.

The spectra were acquired by Raman microscopy, analyzing the surface of the specimen at three solid regions of the weakened portion (known as "bridges"), at points substantially equidistant from the through openings.

TABLE 11

Raman microscopy on the bridges of the weakened portion provided with through openings. The data refer to a laser emission step with 750 W of power and a speed of 45 m/min. For the calculation of Xc (%), the equation of the straight calibration line related to Pot 1 was used.

| Pot 1 Weakened portion | FWHH from Raman | Xc (%) from interpolation | FWHH AVERAGE from Raman | Xc AVERAGE (%) from interpolation |
|---|---|---|---|---|
| Bridge_point1 | 26.145 | 5.658 | 26.114 | 5.722 |
| Bridge_point2 | 26.289 | 5.364 | | |
| Bridge_point3 | 25.908 | 6.144 | | |

The average value of Xc (%) at the trough of the weakened portion was compared with the average value of Xc (%) of the reference by setting the formula ΔXc (%)=weakened portion Xc (%)–"reference" Xc (%).

TABLE 12

Variation in the degree of crystallinity between Xc (%) in the weakened portion and Xc (%) of the previously defined "reference".

| Ref Pot 1-Xc AVERAGE (%) from interpolation | Weakened portion Xc AVERAGE (%) from interpolation | ΔXc (%) = weakened portion Xc (%) − reference Xc (%) |
|---|---|---|
| 5.246 | 5.722 | 0.476 |

c) A laser with 1200 W of power and a speed of 72 m/min was used.

The spectra were acquired by Raman microscopy, analyzing the surface of the specimen at three solid regions of the weakened portion (known as "bridges"), at points substantially equidistant from the through openings.

TABLE 13

Raman microscopy on the bridges of the weakened portion provided with through openings. The data refer to a laser emission step with 1200 W of power and a speed of 72 m/min. For the calculation of Xc (%), the equation of the straight calibration line related to Pot 1 was used.

| Pot 1 Weakened portion | FWHH from Raman | Xc (%) from interpolation | FWHH AVERAGE from Raman | Xc AVERAGE (%) from interpolation |
|---|---|---|---|---|
| Bridge_point1 | 26.412 | 5.112 | 26.153 | 5.642 |
| Bridge_point2 | 25.989 | 5.978 | | |
| Bridge_point3 | 26.058 | 5.837 | | |

The average value of Xc (%) at the trough of the weakened portion was compared with the average value of Xc (%) of the reference by setting the formula ΔXc (%)=weakened portion Xc (%)–"reference" Xc (%).

TABLE 14

Variation in the degree of crystallinity between Xc (%) in the weakened portion and Xc (%) of the previously defined "reference".

| Ref Pot 1-Xc AVERAGE (%) from interpolation | Weakened portion Xc AVERAGE (%) from interpolation | ΔXc (%) = weakened portion Xc (%) − reference Xc (%) |
|---|---|---|
| 5.246 | 5.642 | 0.396 |

Study of the Heat-Sealing Ring

In order to correctly define the reference for subsequent measurements of the variation of the degree of crystallinity correlated to the laser emission step, the heat-sealing ring in Pot 1 was studied. In particular, by means of Raman microscopy, the FWHH values in the upper and lower part of the non-thermoformed region of the pot at the heat-sealing ring were calculated and interpolated in the straight calibration line in order to calculate the degree of crystallinity in said points and compare them with the degree of crystallinity of the reference.

In this case also, the analysis was performed on three points of the heat-sealing ring, both in the upper part and in the lower part.

TABLE 15

Study of the heat-sealing ring. The term "Upper" is understood to mean the upper part of the pot and the term "Lower" is understood to mean the lower part. For the calculation of Xc (%), the equation of the straight calibration line related to Pot 1 was used.

| Pot 1 Heat-seal | FWHH from Raman | Xc (%) from interpolation | FWHH AVERAGE from Raman | Xc AVERAGE (%) from interpolation |
|---|---|---|---|---|
| Upper_point1 | 26.317 | 5.306 | 26.304 | 5.333 |
| Upper_point2 | 26.305 | 5.331 | | |
| Upper_point3 | 26.289 | 5.364 | | |
| Lower_point1 | 26.495 | 4.942 | 26.228 | 5.489 |
| Lower_point2 | 26.201 | 5.544 | | |
| Lower_point3 | 25.987 | 5.982 | | |

TABLE 16

Variation in the degree of crystallinity between Xc (%) at the upper and lower regions of the heat-sealing ring and Xc (%) of the previously defined "reference".

| Ref Pot 1-Xc AVERAGE (%) from interpolation | Upper heat-seal Xc AVERAGE (%) from interpolation | ΔXc (%) = heat-seal Xc (%) − reference Xc (%) |
|---|---|---|
| 5.246 | 5.333 | 0.087 |
| | Lower heat-seal Xc AVERAGE (%) from interpolation | ΔXc (%) = heat-seal Xc (%) − reference Xc (%) |
| | 5.489 | 0.243 |

EXAMPLE 2

Pot 2—thickness 1.27 mm

With pot 2, with a thickness of 1.27 mm in the region not directly subjected to the thermoforming action, a calibration curve was constructed, which is valid only for the case under examination, by preparing specimens with known thermal history obtained from the non-thermoformed and non-heat-sealed part of pot 2.

Since the various steps for constructing the calibration curve have already been presented in detail in Example 1 related to Pot 1 and do not vary for example 2 of pot 2, they will be ignored hereinafter, preferring instead to focus on what was done differently for pot 2.

The analogous specimens with known thermal history were prepared by cooling from 300° C. to 0° C. at X ° C./min with X=20, 100, quench obtained by selecting the "ballistic cool to temp" setting.

For the analysis of the specimens with known thermal history, particularly for determining the degree of crystallinity by DSC calorimetric analysis, fusion peaks in the temperature range 210° C.-266° C. and cold crystallization peaks in the temperature range 120° C.-165° C. were processed.

Raman analysis was performed following the steps already given, with no significant modifications.

For pot 2, the average values of FWHH from Raman microscopy and of degree of crystallinity from DSC were processed by means of a linear trend line, the equation of which was used to interpolate the specimens with unknown crystallinity derived from the same pot 2 (and not others).

Figure 20:
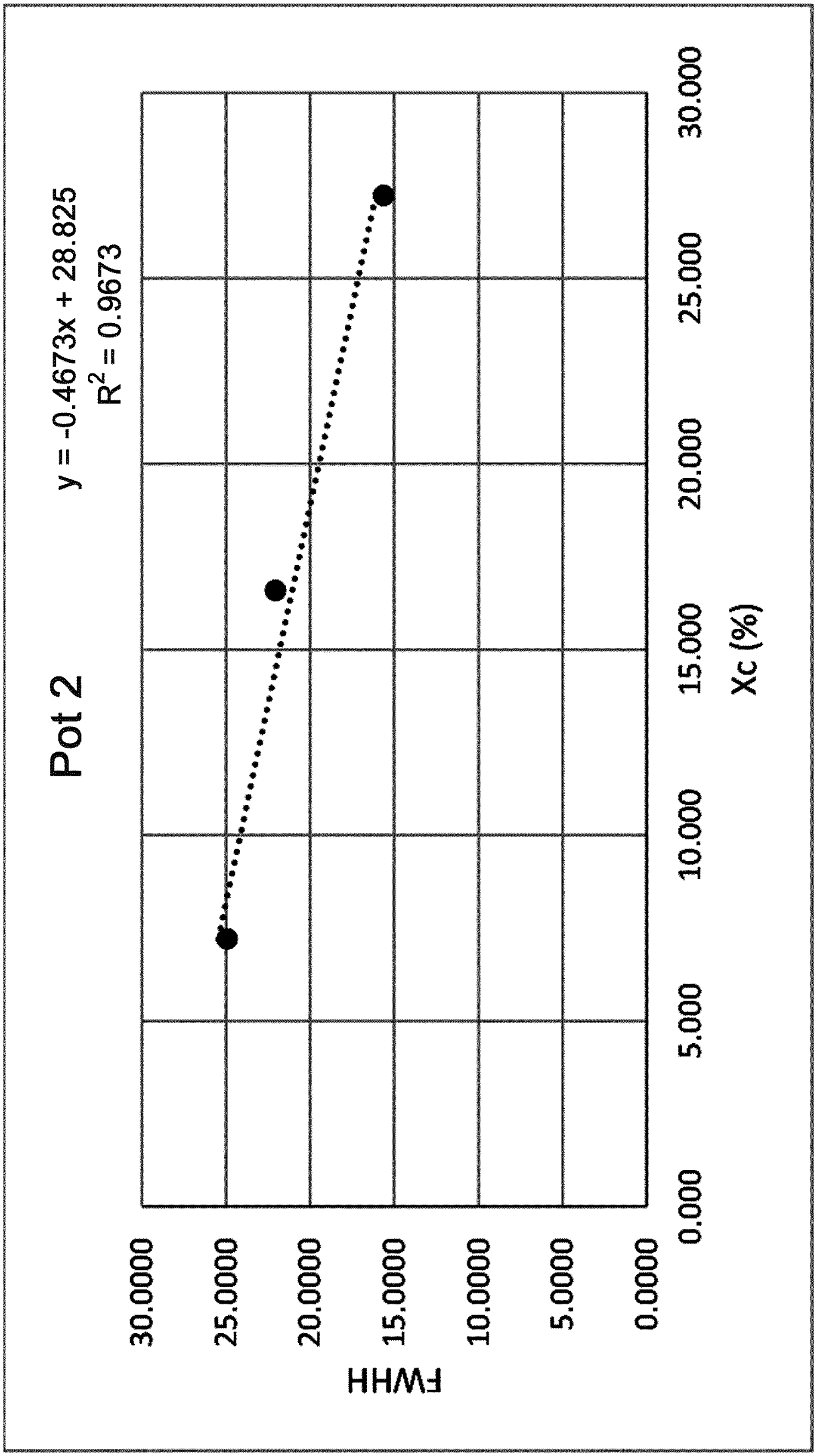
FIG. 20 shows the straight calibration line processed for pot 2, comprising the equation of the straight line and the value of $R^2$.

FIG. 20 shows the straight calibration line, including the equation, for pot 2.

TABLE 17

Values calculated by DSC and Raman microscopy for the construction of the calibration curve.
Pot 2

| Cooling rate in DSC (° C./min) | Average FWHH from Raman | Xc (%) from DSC |
|---|---|---|
| 20 | 15.6391 | 27.221 |
| 100 | 22.0649 | 16.593 |
| Quench | 24.9331 | 7.200 |

Since the initial PET sheet was not available, in the pot 2 specimen, the reference region was located in a semicircular portion of the finished pot:

at least 0.6 mm away from the through cut;

at least 0.3 mm away from the weakened portion;

at least 0.3 mm away from the heat-sealed region.

In the portion thus identified, 3 spectra were acquired using a Raman microscope (the methods for acquiring the spectra and the corresponding processing were carried out as described above for the Raman microscopy technique) and the average of the FWHH values was calculated. The average FWHH value was then interpolated in the straight calibration line constructed for pot 2. This operation allowed to calculate the degree of crystallinity for the reference of pot 2.

TABLE 18

Reference portion of pot 2. For the calculation of Xc (%), the equation of the straight calibration line related to Pot 2 was used.

| Pot 2 | FWHH from Raman | Xc (%) from interpolation | FWHH AVERAGE from Raman | Xc AVERAGE (%) from interpolation |
|---|---|---|---|---|
| Ref_point1 | 25.882 | 6.298 | 25.843 | 6.381 |
| Ref_point2 | 25.752 | 6.576 | | |
| Ref_point3 | 25.896 | 6.268 | | |

Continuous Weakened Portion a) A laser with 300 W of power and a speed equal to 22 m/min was used.

The spectra were acquired by Raman microscopy, analyzing the surface of the specimen at the lower part of the weakened portion (known as "trough").

TABLE 19

Raman microscopy on the trough of the continuous weakened portion. The data refer to a laser emission step with 300 W of power and a speed of 22 m/min. For the calculation of Xc (%), the equation of the straight calibration line related to Pot 2 was used.

| Pot 2 Weakened portion | FWHH from Raman | Xc (%) from interpolation | FWHH AVERAGE from Raman | Xc AVERAGE (%) from interpolation |
|---|---|---|---|---|
| Trough_point1 | 26.059 | 5.919 | 26.059 | 5.918 |
| Trough_point2 | 26.123 | 5.782 | | |
| Trough_point3 | 25.996 | 6.054 | | |

The average value of Xc (%) at the trough of the weakened portion was compared with the average value of Xc (%) of the reference by setting the formula ΔXc (%)=weakened portion Xc (%)−"reference" Xc (%).

TABLE 20

Variation in the degree of crystallinity between Xc (%) in the weakened portion and Xc (%) of the previously defined "reference".

| Ref Pot 2-Xc AVERAGE (%) from interpolation | Weakened portion Xc AVERAGE (%) from interpolation | ΔXc (%) = weakened portion Xc (%) − reference Xc (%) |
|---|---|---|
| 6.276 | 5.918 | −0.358 |

b) A laser with 750 W of power and a speed equal to 68 m/min was used.

The spectra were acquired by Raman microscopy, analyzing the surface of the specimen at the lower part of the weakened portion (known as "trough").

TABLE 21

Raman microscopy on the trough of the continuous weakened portion. The data refer to a laser emission step with 750 W of power and a speed of 68 m/min. For the calculation of Xc (%), the equation of the straight calibration line related to Pot 2 was used.

| Pot 2 Weakened portion | FWHH from Raman | Xc (%) from interpolation | FWHH AVERAGE from Raman | Xc AVERAGE (%) from interpolation |
|---|---|---|---|---|
| Trough_point1 | 26.235 | 5.542 | 26.015 | 6.013 |
| Trough_point2 | 25.854 | 6.358 | | |
| Trough_point3 | 25.956 | 6.140 | | |

The average value of Xc (%) at the trough of the weakened portion was compared with the average value of Xc (%) of the reference by setting the formula ΔXc (%)=weakened portion Xc (%)−"reference" Xc (%).

TABLE 22

| Variation in the degree of crystallinity between Xc (%) in the weakened portion and Xc (%) of the previously defined "reference". | | |
|---|---|---|
| Ref Pot 2-Xc AVERAGE (%) from interpolation | Weakened portion Xc AVERAGE (%) from interpolation | ΔXc (%) = weakened portion Xc (%) − reference Xc (%) |
| 6.276 | 6.013 | −0.263 |

c) A laser with 1200 W of power and a speed equal to 109 m/min was used.

The spectra were acquired by Raman microscopy, analyzing the surface of the specimen at the lower part of the weakened portion (known as "trough").

TABLE 23

Raman microscopy on the trough of the continuous weakened portion. The data refer to a laser emission step with 1200 W of power and a speed of 109 m/min. For the calculation of Xc (%), the equation of the straight calibration line related to Pot 2 was used.

| Pot 2 Weakened portion | FWHH from Raman | Xc (%) from interpolation | FWHH AVERAGE from Raman | Xc AVERAGE (%) from interpolation |
|---|---|---|---|---|
| Trough_point1 | 25.915 | 6.227 | 25.948 | 6.156 |
| Trough_point2 | 25.873 | 6.317 | | |
| Trough_point3 | 26.057 | 5.923 | | |

The average value of Xc (%) at the trough of the weakened portion was compared with the average value of Xc (%) of the reference by setting the formula ΔXc (%)=weakened portion Xc (%)−"reference" Xc (%).

TABLE 24

| Variation in the degree of crystallinity between Xc (%) in the weakened portion and Xc (%) of the previously defined "reference". | | |
|---|---|---|
| Ref Pot 2-Xc AVERAGE (%) from interpolation | Weakened portion Xc AVERAGE (%) from interpolation | ΔXc (%) = weakened portion Xc (%) − reference Xc (%) |
| 6.276 | 6.156 | −0.120 |

Weakened Portion Provided with Through Openings a) A laser with 300 W of power and a speed of 21 m/min was used.

The spectra were acquired by Raman microscopy, analyzing the surface of the specimen at three solid regions of the weakened portion (known as "bridges"), at points substantially equidistant from the through openings.

Raman microscopy on the bridges of the weakened portion provided with through openings. The data refer to a laser emission step with 300 W of power and a speed of 21 m/min. For the calculation of Xc (%), the equation of the straight calibration line related to Pot 2 was used.

| Pot 2 Weakened portion | FWHH from Raman | Xc (%) from interpolation | FWHH AVERAGE from Raman | Xc AVERAGE (%) from interpolation |
|---|---|---|---|---|
| Bridge_point1 | 26.345 | 5.307 | 26.186 | 5.647 |
| Bridge_point2 | 26.178 | 5.664 | | |
| Bridge_point3 | 26.036 | 5.968 | | |

The average value of Xc (%) at the trough of the weakened portion was compared with the average value of Xc (%) of the reference by setting the formula ΔXc (%)=weakened portion Xc (%)−"reference" Xc (%).

| Variation in the degree of crystallinity between Xc in the weakened portion and Xc of the previously defined "reference". | | |
|---|---|---|
| Ref Pot 2-Xc AVERAGE (%) from interpolation | Weakened portion Xc AVERAGE (%) from interpolation | ΔXc (%) = weakened portion Xc (%) − reference Xc (%) |
| 6.276 | 5.647 | −0.629 |

b) A laser with 750 W of power and a speed of 55 m/min was used.

The spectra were acquired by Raman microscopy, analyzing the surface of the specimen at three solid regions of the weakened portion (known as "bridges"), at points substantially equidistant from the through openings.

TABLE 27

Raman microscopy on the bridges of the weakened portion provided with through openings. The data refer to a laser emission step with 750 W of power and a speed of 55 m/min. For the calculation of Xc (%), the equation of the straight calibration line related to Pot 2 was used.

| Pot 2 Weakened portion | FWHH from Raman | Xc (%) from interpolation | FWHH AVERAGE from Raman | Xc AVERAGE (%) from interpolation |
|---|---|---|---|---|
| Bridge_point1 | 25.915 | 6.227 | 25.905 | 6.249 |
| Bridge_point2 | 25.836 | 6.396 | | |
| Bridge_point3 | 25.964 | 6.122 | | |

The average value of Xc (%) at the trough of the weakened portion was compared with the average value of Xc (%) of the reference by setting the formula ΔXc (%)=weakened portion Xc (%)−"reference" Xc (%).

TABLE 28

| Variation in the degree of crystallinity between Xc in the weakened portion and Xc of the previously defined "reference". | | |
|---|---|---|
| Ref Pot 2-Xc AVERAGE (%) from interpolation | Weakened portion Xc AVERAGE (%) from interpolation | ΔXc (%) = weakened portion Xc (%) − reference Xc (%) |
| 6.276 | 6.249 | −0.027 |

c) A laser with 1200 W of power and a speed of 88 m/min was used.

The spectra were acquired by Raman microscopy, analyzing the surface of the specimen at three solid regions of the weakened portion (known as "bridges"), at points substantially equidistant from the through openings.

TABLE 29

Raman microscopy on the bridges of the weakened portion provided with through openings. The data refer to a laser emission step with 1200 W of power and a speed of 88 m/min. For the calculation of Xc (%), the equation of the straight calibration line related to Pot 2 was used.

| Pot 2 Weakened portion | FWHH from Raman | Xc (%) from interpolation | FWHH AVERAGE from Raman | Xc AVERAGE (%) from interpolation |
|---|---|---|---|---|
| Bridge_point1 | 25.975 | 6.099 | 26.029 | 5.983 |
| Bridge_point2 | 26.005 | 6.035 | | |
| Bridge_point3 | 26.108 | 5.814 | | |

The average value of Xc (%) at the trough of the weakened portion was compared with the average value of Xc (%) of the reference by setting the formula ΔXc (%)=weakened portion Xc (%)−"reference" Xc (%).

TABLE 30

Variation in the degree of crystallinity between Xc (%) in the weakened portion and Xc (%) of the previously defined "reference".

| Ref Pot 2-Xc AVERAGE (%) from interpolation | Weakened portion Xc AVERAGE (%) from interpolation | ΔXc (%) = weakened portion Xc (%) − reference Xc (%) |
|---|---|---|
| 6.276 | 5.983 | −0.293 |

Study of the Heat-Sealing Ring

In order to correctly define the reference for subsequent measurements of the variation in the degree of crystallinity related to the laser emission step, the heat-sealing ring in pot 2 was studied. In particular, by means of Raman microscopy, the FWHH values in the upper and lower part of the non-thermoformed region of the pot at the heat-sealing ring were calculated and interpolated in the straight calibration line in order to calculate the degree of crystallinity in said points and compare them with the degree of crystallinity of the pot.

In this case also, the analysis was performed on three points of the heat-sealing ring, both in the upper part and in the lower part.

TABLE 31

Study of the heat-sealing ring. The term "Upper" is understood to mean the upper part of the pot and the term "Lower" is understood to mean the lower part. For the calculation of Xc (%), the equation of the straight calibration line related to Pot 2 was used.

| Pot 2 Heat-seal | FWHH from Raman | Xc (%) from interpolation | FWHH AVERAGE from Raman | Xc AVERAGE (%) from interpolation |
|---|---|---|---|---|
| Upper_point1 | 26.013 | 6.018 | 25.974 | 6.100 |
| Upper_point2 | 25.974 | 6.101 | | |
| Upper_point3 | 25.936 | 6.182 | | |
| Lower_point1 | 26.193 | 5.632 | 25.985 | 6.077 |
| Lower_point2 | 25.779 | 6.518 | | |
| Lower_point3 | 25.983 | 6.082 | | |

TABLE 32

Variation in the degree of crystallinity between Xc (%) at the upper and lower regions of the heat-sealing ring and Xc (%) of the previously defined "reference".

| Ref Pot 2-Xc AVERAGE (%) from interpolation | Upper heat-seal Xc AVERAGE (%) from interpolation | ΔXc (%) = heat-seal Xc (%) − reference Xc (%) |
|---|---|---|
| 6.276 | 6.100 | −0.176 |
| | Lower heat-seal Xc AVERAGE (%) from interpolation | ΔXc (%) = heat-seal Xc (%) − reference Xc (%) |
| | 6.077 | −0.199 |

EXAMPLE 3

Sheet Made of PET with a Thickness of 1 mm

With a sheet made of PET, with a thickness of 1 mm, a calibration curve, valid for the case under examination only, was constructed by preparing specimens with known thermal history, obtained in a part of the sheet not subjected to laser action.

Since the various steps for constructing the calibration curve have already been presented in detail in Example 1 with reference to Pot 1 and do not change for the PET sheet, they will be ignored hereinafter, preferring instead to focus attention on what was done differently for the PET sheet.

The analogous specimens with known thermal history were prepared by cooling from 300° C. to 0° C. at X ° C./min with X=20, 50, 100, 200, quench obtained by selecting the "ballistic cool to temp" setting.

For analysis of the specimens with known thermal history, particularly, in order to determine the degree of crystallinity by DSC calorimetric analysis, fusion peaks in the 210° C.-263° C. temperature range and cold crystallization peaks in the 118° C.-185° C. temperature range were processed.

Raman analysis was performed following the steps already specified, with no significant modifications.

For the sheet with a thickness of 1 mm, the average values of the FWHH from Raman microscopy and of the degree of crystallinity from DSC were processed by means of a linear trend line, the equation of which was used to interpolate the specimens with unknown crystallinity derived from the same 1-mm sheet (and not others).

Figure 21:
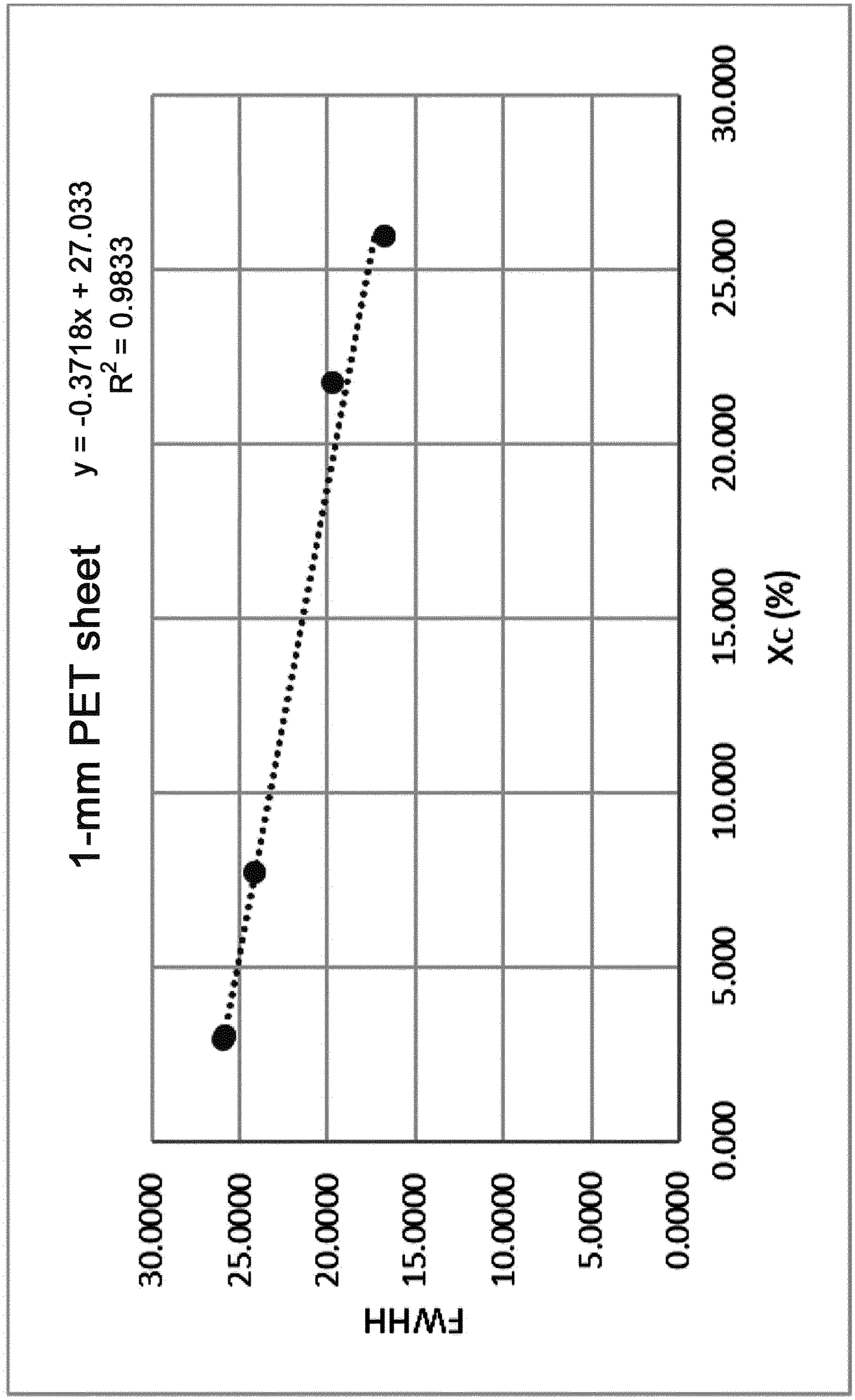
FIG. 21 shows the straight calibration line processed for the 1-mm PET sheet, comprising the equation of the straight line and the value of $R^2$.

FIG. 21 shows the straight calibration line, comprising the equation, for the 1-mm sheet made of PET.

TABLE 33

Values calculated by DSC and Raman microscopy for the construction of the calibration curve. 1-mm PET sheet

| Cooling rate in DSC (° C./min) | Average FWHH from Raman | Xc (%) from DSC |
|---|---|---|
| 20 | 16.7275 | 25.957 |
| 50 | 19.7630 | 21.750 |
| 100 | 24.1172 | 7.679 |

TABLE 33-continued

| Values calculated by DSC and Raman microscopy for the construction of the calibration curve. 1-mm PET sheet | | |
|---|---|---|
| Cooling rate in DSC (° C./min) | Average FWHH from Raman | Xc (%) from DSC |
| Quench | 25.8468 | 3.007 |
| 200 | 25.9155 | 2.914 |

The equation related to the straight calibration line thus constructed was used to derive the degree of crystallinity of the reference and of the weakened portion, in order to verify that the variation between the two degrees of crystallinity is less than 3%.

On a surface of a sheet made of PET not subjected to the action of the laser, 3 spectra were acquired by Raman microscope (mode of spectra acquisition and associated processing were performed as described earlier) and the average of the calculated FWHH values was calculated. The average FWHH value was then interpolated in the straight calibration line constructed for the 1-mm PET sheet. This operation allowed to calculate the degree of crystallinity of the sheet not subjected to laser action.

TABLE 34

Analyzed surface portion of the sheet not subjected to laser action. For the calculation of Xc (%), the straight calibration line constructed for this specimen was used.

| 1-mm PET sheet | FWHH from Raman | Xc (%) from interpolation | FWHH AVERAGE from Raman | Xc AVERAGE (%) from interpolation |
|---|---|---|---|---|
| Sheet_point1 | 26.065 | 2.604 | 25.909 | 3.022 |
| Sheet_point2 | 25.812 | 3.284 | | |
| Sheet_point3 | 25.851 | 3.179 | | |

Continuous Weakened Portion a) A laser with 300 W of power and a speed of 22 m/min was used.

The spectra were acquired by Raman microscopy, analyzing the surface of the specimen at the lower part of the weakened portion (known as "trough").

TABLE 35

Raman microscopy on the trough of the continuous weakened portion. The data refer to a laser emission step with 300 W of power and a speed of 22 m/min. The equation of the straight calibration line related to the 1-mm PET sheet was used to calculate Xc (%).

| 1-mm PET sheet Weakened portion | FWHH from Raman | Xc (%) from interpolation | FWHH AVERAGE from Raman | Xc AVERAGE (%) from interpolation |
|---|---|---|---|---|
| Trough_point1 | 26.081 | 2.561 | 25.932 | 2.962 |
| Trough_point2 | 25.788 | 3.349 | | |
| Trough_point3 | 25.926 | 2.977 | | |

The average value of Xc (%) at the trough of the weakened portion was compared with the average value of Xc (%) of the reference by setting the formula ΔXc (%)=weakened portion Xc (%)−"reference" Xc (%).

TABLE 36

Variation in the degree of crystallinity between Xc (%) in the weakened portion and Xc (%) of the previously defined "reference".

| Ref PET sheet-Xc AVERAGE (%) from interpolation | Weakened portion Xc AVERAGE (%) from interpolation | ΔXc (%) = weakened portion Xc (%) − reference Xc (%) |
|---|---|---|
| 3.022 | 2.962 | −0.060 |

b) A laser with 750 W of power and a speed of 32 m/min was used.

The spectra were acquired by Raman microscopy, analyzing the surface of the specimen at the lower part of the weakened portion (known as "trough").

TABLE 37

Raman microscopy on the trough of the continuous weakened portion. The data refer to a laser emission step with 750 W of power and a speed of 32 m/min. The equation of the straight calibration line related to the 1-mm PET sheet was used to calculate Xc (%).

| 1-mm PET sheet Weakened portion | FWHH from Raman | Xc (%) from interpolation | FWHH AVERAGE grom Raman | Xc AVERAGE (%) from interpolation |
|---|---|---|---|---|
| Trough_point1 | 26.058 | 2.622 | 26.179 | 2.297 |
| Trough_point2 | 26.528 | 1.358 | | |
| Trough_point3 | 25.951 | 2.910 | | |

The average value of Xc (%) at the trough of the weakened portion was compared with the average value of Xc (%) of the reference by setting the formula ΔXc (%)=weakened portion Xc (%)−"reference" Xc (%).

TABLE 38

Variation in the degree of crystallinity between Xc (%) in the weakened portion and Xc (%) of the previously defined "reference".

| Ref PET sheet-Xc AVERAGE (%) from interpolation | Weakened portion Xc AVERAGE (%) from interpolation | ΔXc (%) = weakened portion Xc (%) − reference Xc (%) |
|---|---|---|
| 3.022 | 2.297 | −0.725 |

c) A laser with 1200 W of power and a speed of 92 m/min was used.

The spectra were acquired by Raman microscopy, analyzing the surface of the specimen at the lower part of the weakened portion (known as "trough").

TABLE 39

Raman microscopy on the trough of the continuous weakened portion. The data refer to a laser emission step with 1200 W of power and a speed of 92 m/min. The equation of the straight calibration line related to the 1-mm PET sheet was used to calculate Xc (%).

| 1-mm PET sheet Weakened portion | FWHH from Raman | Xc (%) from interpolation | FWHH AVERAGE from Raman | Xc AVERAGE (%) from interpolation |
|---|---|---|---|---|
| Trough_point1 | 26.009 | 2.754 | 25.930 | 2.966 |
| Trough_point2 | 25.946 | 2.924 | | |
| Trough_point3 | 25.836 | 3.219 | | |

The average value of Xc (%) at the trough of the weakened portion was compared with the average value of Xc (%) of the reference by setting the formula ΔXc (%)=weakened portion Xc (%)−"reference" Xc (%).

TABLE 40

Variation in the degree of crystallinity between Xc (%) in the weakened portion and Xc (%) of the previously defined "reference".

| Ref PET sheet-Xc AVERAGE (%) from interpolation | Weakened portion Xc AVERAGE (%) from interpolation | ΔXc (%) = weakened portion Xc (%) − reference Xc (%) |
|---|---|---|
| 3.022 | 2.966 | −0.056 |

Weakened Portion Provided with Through Openings a) A laser with 300 W of power and a speed of 20 m/min was used.

The spectra were acquired by Raman microscopy, analyzing the surface of the specimen at three solid regions of the weakened portion (known as "bridges"), at points substantially equidistant from the through openings.

TABLE 41

Raman microscopy on the bridges of the weakened portion provided with through openings. The data refer to a laser emission step with 300 W of power and a speed of 20 m/min. The equation of the straight calibration line related to the 1-mm PET sheet was used to calculate Xc (%).

| 1-mm PET sheet Weakened portion | FWHH from Raman | Xc (%) from interpolation | FWHH AVERAGE from Raman | Xc AVERAGE (%) from interpolation |
|---|---|---|---|---|
| Bridge_point1 | 26.252 | 2.101 | 26.181 | 2.290 |
| Bridge_point2 | 26.163 | 2.340 | | |
| Bridge_point3 | 26.13 | 2.429 | | |

The average value of Xc (%) at the trough of the weakened portion was compared with the average value of Xc (%) of the reference by setting the formula ΔXc (%)=weakened portion Xc (%)−"reference" Xc (%).

TABLE 42

Variation in the degree of crystallinity between Xc (%) in the weakened portion and Xc (%) of the previously defined "reference".

| Ref PET sheet-Xc AVERAGE (%) from interpolation | Weakened portion Xc AVERAGE (%) from interpolation | ΔXc (%) = weakened portion Xc (%) − reference Xc (%) |
|---|---|---|
| 3.022 | 2.290 | −0.732 |

b) A laser with 750 W of power and a speed of 25 m/min was used.

The spectra were acquired by Raman microscopy, analyzing the surface of the specimen at three solid regions of the weakened portion (known as "bridges"), at points substantially equidistant from the through openings.

TABLE 43

Raman microscopy on the bridges of the weakened portion provided with through openings. The data refer to a laser emission step with 750 W of power and a speed of 25 m/min. The equation of the straight calibration line related to the 1-mm PET sheet was used to calculate Xc (%).

| 1-mm PET sheet Weakened portion | FWHH from Raman | Xc (%) from interpolation | FWHH AVERAGE from Raman | Xc AVERAGE (%) from interpolation |
|---|---|---|---|---|
| Bridge_point1 | 25.963 | 2.878 | 26.023 | 2.716 |
| Bridge_point2 | 25.862 | 3.150 | | |
| Bridge_point3 | 26.245 | 2.119 | | |

The average value of Xc (%) at the trough of the weakened portion was compared with the average value of Xc (%) of the reference by setting the formula ΔXc (%)=weakened portion Xc (%)−"reference" Xc (%).

TABLE 44

| Variation in the degree of crystallinity between Xc (%) in the weakened portion and Xc (%) of the previously defined "reference". | | |
|---|---|---|
| Ref PET sheet-Xc AVERAGE (%) from interpolation | Weakened portion Xc AVERAGE (%) from interpolation | ΔXc (%) = weakened portion Xc (%) − reference Xc (%) |
| 3.022 | 2.716 | −0.306 |

c) A laser with 1200 W of power and a speed of 58/min was used.

The spectra were acquired by Raman microscopy, analyzing the surface of the specimen at three solid regions of the weakened portion (known as "bridges"), at points substantially equidistant from the through openings.

TABLE 45

| Raman microscopy on the bridges of the weakened portion provided with through openings. The data refer to a laser emission step with 1200 W of power and a speed of 58 m/min. The equation of the straight calibration line related to the 1-mm PET sheet was used to calculate Xc (%). | | | | |
|---|---|---|---|---|
| 1-mm PET sheet Weakened portion | FWHH from Raman | Xc (%) from interpolation | FWHH AVERAGE from Raman | Xc AVERAGE (%) from interpolation |
| Bridge_point1 | 26.037 | 2.679 | 26.000 | 2.778 |
| Bridge_point2 | 26.198 | 2.246 | | |
| Bridge_point3 | 25.765 | 3.410 | | |

The average value of Xc (%) at the trough of the weakened portion was compared with the average value of Xc (%) of the reference by setting the formula ΔXc (%)=weakened portion Xc (%)−"reference" Xc (%).

TABLE 46

| Variation in the degree of crystallinity between Xc (%) in the weakened portion and Xc (%) of the previously defined "reference". | | |
|---|---|---|
| Ref PET sheet-Xc AVERAGE (%) from interpolation | Weakened portion Xc AVERAGE (%) from interpolation | ΔXc (%) = weakened portion Xc (%) − reference Xc (%) |
| 3.022 | 2.778 | −0.244 |

EXAMPLE 4

Sheet made of PET with a thickness of 1 mm.

Low-power and low-speed tests.

The following tests were carried out in order to verify the effect of the action of a low-power laser (with a power less than 250 W) acting on the PET sheet at low speeds (with speeds less than 15 m/min).

The specimen on which the tests were conducted is similar to the specimen presented in the previous Example 3: the straight calibration line constructed and shown for the specimen of Example 3 is therefore also valid for Example 4 being considered and was used for the calculations reported below, in order to verify whether the variation between the degrees of crystallinity of the reference region and of the weakened portion was less than 3%.

On a surface of a PET sheet not subjected to the action of the laser, 3 spectra were acquired by Raman microscope (mode of spectra acquisition and associated processing were performed as described earlier) and the average of the calculated FWHH values was calculated. The average FWHH value was then interpolated in the straight calibration line constructed for the 1-mm PET sheet. This operation allowed to calculate the degree of crystallinity of the sheet not subjected to laser action.

TABLE 47

| Analyzed surface portion of the sheet not subjected to laser action. For the calculation of Xc (%), the straight calibration line constructed for this specimen was used. | | | | |
|---|---|---|---|---|
| 1-mm PET sheet | FWHH from Raman | Xc (%) from interpolation | FWHH AVERAGE from Raman | Xc AVERAGE (%) from interpolation |
| Sheet_point1 | 25.975 | 2.846 | | |
| Sheet_point2 | 26.086 | 2.547 | | |
| Sheet_point3 | 26.017 | 2.733 | 26.026 | 2.708 |

Low-power and low-speed tests.

a) A laser with 150 W of power and a speed of 13 m/min was used.

The spectra were acquired by Raman microscopy, analyzing the surface of the specimen at the lower part of the weakened portion (known as "trough").

TABLE 48

Raman microscopy on the trough of the continuous weakened portion. The data refer to a laser emission step with 150 W of power and a speed of 13 m/min. The equation of the straight calibration line related to the 1-mm PET sheet was used to calculate Xc (%).

| 1-mm PET sheet weakened portion | FWHH from Raman | Xc (%) from interpolation | FWHH AVERAGE from Raman | Xc AVERAGE (%) from interpolation |
|---|---|---|---|---|
| Trough_point1 | 22.92 | 11.062 | 23.032 | 10.760 |
| Trough_point2 | 22.891 | 11.329 | | |
| Trough_point3 | 23.356 | 9.890 | | |

The average value of Xc (%) at the trough of the weakened portion was compared with the average value of Xc (%) of the reference by setting the formula ΔXc (%)=weakened portion Xc (%)−"Reference" Xc (%).

TABLE 49

Variation in the degree of crystallinity between Xc (%) in the weakened portion and Xc (%) of the previously defined "reference".

| Ref PET sheet-Xc AVERAGE (%) from interpolation | Weakened portion Xc AVERAGE (%) from interpolation | ΔXc (%) = weakened portion Xc (%) − reference Xc (%) |
|---|---|---|
| 2.708 | 10.760 | 8.052 |

b) A laser with 75 W of power and a speed of 8 m/min was used.

The spectra were acquired by Raman microscopy, analyzing the surface of the specimen at the lower part of the weakened portion (known as "trough").

TABLE 50

Raman microscopy on the trough of the continuous weakened portion. The data refer to a laser emission step with 75 W of power and a speed of 8 m/min. The equation of the straight calibration line related to the 1-mm PET sheet was used to calculate Xc (%).

| 1-mm PET sheet weakened portion | FWHH from Raman | Xc (%) from interpolation | FWHH AVERAGE from Raman | Xc AVERAGE (%) from interpolation |
|---|---|---|---|---|
| Trough_point1 | 24.286 | 7.388 | 24.028 | 8.081 |
| Trough_point2 | 24.241 | 7.509 | | |
| Trough_point3 | 23.558 | 9.346 | | |

The average value of Xc (%) at the trough of the weakened portion was compared with the average value of Xc (%) of the reference by setting the formula ΔXc (%)=weakened portion Xc (%)−"reference" Xc (%).

TABLE 51

Variation in the degree of crystallinity between Xc (%) in the weakened portion and Xc (%) of the previously defined "reference".

| Ref PET sheet-Xc AVERAGE (%) from interpolation | Weakened portion Xc AVERAGE (%) from interpolation | ΔXc (%) = weakened portion Xc (%) − reference Xc (%) |
|---|---|---|
| 2.708 | 8.081 | 5.373 |

In conducting the tests of this Example 4 at low power and low speed, it was observed that even with a low-power laser emission step acting at low speeds it is possible to provide a continuous weakened portion with a reduction in cross-section suitable to facilitate the separation of the pots at the weakened portion thus provided. From subsequent analyses, however, it has been observed that working under these conditions an increase in the degree of crystallinity is obtained at the weakened portion, such that the variation in the degree of crystallinity between the weakened portion and the reference is greater than the value of +3% indicated previously.

On the one hand, this finding is in accord with what has been reported in the literature, according to which an increase in crystallinity is associated with an increase in the fragility of the specimen; on the other hand, it confirms that the action of laser radiation has an effect on the material that goes beyond the mere reduction in cross-section. The application of heat associated with the laser radiation and transferred onto the material in fact imparts a variation of the local characteristics of the material, ranging from the mere variation of the tension state of the material (high-power and high-speed laser radiation) to an increase in crystallinity (low-power and low-speed laser radiation).

Low speeds of action of the laser (equal to 13 m/min for a 150-W laser and equal to 8 m/min for a 75-W laser), which nevertheless lead to the desired result of mutual separation of the pots, also correspond, however, to long production times of the weakened portion, thus outlining a scenario that is not compatible with the need for high industrial productivity.

In practice it has been found that the disclosure achieves the intended aim and advantages by providing a method that is extremely flexible and capable of allowing to provide weakened portions, even on containers made of PET, which allow practical and simple mutual separation of the containers.

In practice it has been found that the disclosure achieves the intended aim and advantages, providing an extremely flexible method capable of allowing to provide weakened portions, even on containers made of PET, which allow a practical and simple mutual separation of the containers.

The advantages of the method illustrated in the present disclosure can be traced back to the possibility to operate with particularly powerful laser radiation emission systems, which allow in particular to solve the problem of producing PET containers, avoiding the use of blades or cutters and reducing the costs related to system maintenance, to utilize an extremely flexible method for the provision of containers of different shapes and sizes, and to have a system that maintains the high speeds of industrial production.

The disclosure thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102020000000787 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A method for the production and filling of containers designed to contain food, the method including the following steps:

shaping a sheet made of PET (polyethylene terephthalate) in order to provide a plurality of accommodation receptacles provided with at least one access inlet, said PET sheet having an initial degree of crystallinity in the range of 5% to 10%, filling, through said access inlet, said accommodation receptacles with at least one food, sealing said at least one access inlet by means of a closure film, and providing a weakened portion at a connecting edge between at least two adjacent accommodation receptacles, said provision step comprising a step of emission of laser radiation at at least one portion of said connecting edge in order to provide a localized reduction of a transverse cross-section of said connecting edge along said weakened portion, wherein the localized reduction of the transverse cross-section is at least equal to 50%, at least equal to 70%, or at least equal to 80% with respect to the initial cross-section;

a final degree of crystallinity at said weakened portion after said step of emission of laser radiation having a deviation of 3% from the initial degree of crystallinity.

2. The method according to claim 1, wherein the thickness of said connecting edge is comprised between 300 microns and 1800 microns.

3. The method according to claim 1, wherein said sheet made of PET comprises a sheet made of transparent PET.

4. The method according to claim 1, wherein the provision step comprises a step of emission of laser radiation which has a power comprised between 250 W and 1500 W, and a travel speed across the connecting edge comprised between 15 m/min and 170 m/min.

5. The method according to claim 1, wherein the provision step comprises a step of emission of laser radiation which has a power of more than 500 W and a travel speed across the connecting edge greater than 60 m/min.

6. The method according to claim 1, wherein said provision step is adapted to provide a localized reduction of said connecting edge that is substantially constant along a longitudinal extension of said weakened portion.

7. The method according to claim 1, wherein said provision step is adapted to provide a plurality of through openings through said connecting edge which are mutually spaced in order to provide said weakened portion.

8. The method according to claim 1, wherein a calculation of the degree of crystallinity of the region subjected to the step of emission of the laser radiation is obtained by performing analysis by Raman microscopy on at least three points of the specimen and by means of interpolation in a calibration curve of a mean value of FWHH calculated on a signal that covers a Raman shift interval comprised between 1700-1760 cm-1.

9. The method according to claim 8, wherein a region of interest on which to identify the at least three points of the specimen to calculate the degree of crystallinity of the region subjected to said emission step is defined in the lower part of said weakened portion if said weakened portion comprises a localized reduction of said connecting edge that is constant along a longitudinal extension, or is formed at solid regions, which are equidistant from said through openings in the weakened portions provided with through openings.

10. The method according to claim 1, wherein said step of provision of a weakened portion is performed after said sealing step.

11. The method according to claim 1, further comprising a sterilization step performed upstream or downstream of said shaping step.

12. The method according to claim 1, further comprising a step of extraction of gases and volatile substances performed substantially at said emission step.

* * * * *